(12) United States Patent
Hahn et al.

(10) Patent No.: US 6,975,244 B2
(45) Date of Patent: Dec. 13, 2005

(54) OSCILLATING SHEAR VALVE FOR MUD PULSE TELEMETRY AND ASSOCIATED METHODS OF USE

(75) Inventors: Detlef Hahn, Hannover (DE); Volker Peters, Wienhausen (DE); Cedric Rouatbi, Celle (DE); Heiko Eggers, Dorfmark (DE)

(73) Assignee: Baker Hughes Incorporated, Houston, TX (US)

( * ) Notice: Subject to any disclaimer, the term of this patent is extended or adjusted under 35 U.S.C. 154(b) by 14 days.

(21) Appl. No.: 10/223,169

(22) Filed: Aug. 19, 2002

(65) Prior Publication Data

US 2003/0056985 A1 Mar. 27, 2003

Related U.S. Application Data

(63) Continuation-in-part of application No. 09/794,964, filed on Feb. 27, 2001, now Pat. No. 6,626,253.

(51) Int. Cl.$^7$ ............................ E21B 47/18; G01V 3/34; G01V 3/00
(52) U.S. Cl. ............................. 340/855.7; 340/855.4; 175/40; 367/84
(58) Field of Search ....................... 175/48, 56, 40; 367/84, 83; 340/855.4, 855.7

(56) References Cited

U.S. PATENT DOCUMENTS

| | | |
|---|---|---|
| 2,901,685 A | 8/1959 | Alder |
| 2,964,116 A | 12/1960 | Peterson |
| 2,973,505 A | 2/1961 | Johannesen |
| 3,065,416 A | 11/1962 | Jeter |
| 3,302,457 A | 2/1967 | Mayes |
| 3,309,656 A | 3/1967 | Godbey |
| 3,693,428 A | 9/1972 | LePeuvedic et al. |
| 3,713,089 A | 1/1973 | Clacomb |

(Continued)

FOREIGN PATENT DOCUMENTS

| | | |
|---|---|---|
| GB | 2096372 | 10/1982 |
| GB | 2156405 A | 10/1985 |

OTHER PUBLICATIONS

Monroe, Applying Digital Data–Encoding Techniques To Mud Pulse Telemetry, SPE 20326, Fifth SPE Petroleum Computer Conference, Denver, Colorado, Jun. 25–28, 1990, pp. 7–16.

Primary Examiner—David Bagnell
Assistant Examiner—Shane Bomar
(74) Attorney, Agent, or Firm—Madan, Mossman & Sriram, P.C.

(57) ABSTRACT

An oscillating shear valve system for generating pressure fluctuations in a flowing drilling fluid comprising a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced, multivalent data encoding. The rotor is driven by a motorized gear drive. In one embodiment, a torsional spring is attached to the motor and the resulting spring mass system is designed to be near resonance at the desired pulse frequency. The system enables the use of multivalent encoding schemes for increasing data rates.

43 Claims, 20 Drawing Sheets

U.S. PATENT DOCUMENTS

| | | | |
|---|---|---|---|
| 3,732,728 A | 5/1973 | Fitzpatrick | |
| 3,736,558 A | 5/1973 | Cubberly, Jr. | |
| 3,737,843 A | 6/1973 | LePeuvedi | |
| 3,739,331 A | 6/1973 | Godbey et al. | |
| 3,742,443 A | * 6/1973 | Foster et al. | 367/83 |
| 3,764,968 A | 10/1973 | Anderson | 340/18 NC |
| 3,764,969 A | 10/1973 | Cubberly | |
| 3,764,970 A | 10/1973 | Manning | |
| 3,770,006 A | 11/1973 | Sexton et al. | |
| 3,958,217 A | 5/1976 | Spinnler | 340/18 LD |
| 3,964,556 A | 6/1976 | Gearhart et al. | |
| 3,982,224 A | 9/1976 | Patton | 340/18 |
| 4,007,805 A | 2/1977 | Reber | |
| RE29,734 E | 8/1978 | Manning | |
| RE30,055 E | 7/1979 | Claycomb | 340/18 LD |
| 4,166,979 A | 9/1979 | Waggener | 325/321 |
| 4,167,000 A | * 9/1979 | Bernard et al. | 367/84 |
| 4,351,037 A | 9/1982 | Scherbatskoy | 367/85 |
| 4,462,469 A | 7/1984 | Brown | |
| 4,499,563 A | 2/1985 | Jurgens | |
| 4,628,495 A | 12/1986 | Peppers et al. | |
| 4,630,244 A | 12/1986 | Larronde | 367/84 |
| 4,662,459 A | * 5/1987 | Bodine | 175/56 |
| 4,675,852 A | 6/1987 | Russell et al. | 367/84 |
| RE32,463 E | 7/1987 | Westlake et al. | |
| 4,686,658 A | 8/1987 | Davison | 367/85 |
| 4,698,794 A | 10/1987 | Kruger et al. | |
| 4,703,461 A | 10/1987 | Kotlyar | 367/83 |
| 4,734,892 A | 3/1988 | Kotlyar | |
| 4,771,408 A | 9/1988 | Kotlyar | 367/83 |
| 4,785,300 A | 11/1988 | Chin et al. | 340/861 |
| 4,790,393 A | 12/1988 | Larronde et al. | |
| 4,796,699 A | 1/1989 | Upchurch | |
| 4,847,815 A | 7/1989 | Malone | |
| 4,914,637 A | 4/1990 | Goodsman | |
| 4,915,168 A | 4/1990 | Upchurch | |
| 4,953,595 A | 9/1990 | Kotlyar | 137/624.13 |
| 4,956,823 A | 9/1990 | Russell et al. | 367/84 |
| 4,982,811 A | 1/1991 | Hardee | 181/106 |
| 5,034,929 A | 7/1991 | Cobern et al. | |
| 5,073,877 A | * 12/1991 | Jeter | 367/84 |
| 5,079,750 A | 1/1992 | Scherbatskoy | |
| 5,113,379 A | 5/1992 | Scherbatskoy | |
| 5,119,344 A | 6/1992 | Innes | 367/84 |
| 5,182,731 A | 1/1993 | Hoelscher et al. | 367/84 |
| 5,189,645 A | 2/1993 | Innes | 367/84 |
| 5,215,152 A | 6/1993 | Duckworth | 175/48 |
| 5,249,161 A | 9/1993 | Jones et al. | 367/83 |
| 5,357,483 A | 10/1994 | Innes | |
| 5,375,098 A | 12/1994 | Malone et al. | |
| 5,517,464 A | * 5/1996 | Lerner et al. | 367/84 |
| 5,586,084 A | * 12/1996 | Barron et al. | 367/85 |
| 5,691,712 A | 11/1997 | Meek et al. | |
| 5,740,126 A | 4/1998 | Chin et al. | |
| 5,787,052 A | 7/1998 | Gardner et al. | |
| 5,963,138 A | 10/1999 | Gruenhagen | 640/679 |
| 5,988,994 A | * 11/1999 | Berchowitz | 417/415 |
| 6,089,332 A | 7/2000 | Barr et al. | 175/45 |
| 6,105,690 A | 8/2000 | Biglin, Jr. et al. | |
| 6,219,301 B1 | 4/2001 | Moriarty | 367/84 |
| 6,289,998 B1 | 9/2001 | Krueger et al. | |
| 6,469,637 B1 | * 10/2002 | Seyler et al. | 340/856.3 |
| 6,626,253 B2 | * 9/2003 | Hahn et al. | 175/48 |
| 6,714,138 B1 | * 3/2004 | Turner et al. | 340/854.3 |
| 2002/0148645 A1 | * 10/2002 | Falgout | 175/40 |
| 2004/0035608 A1 | * 2/2004 | Meehan et al. | 175/40 |

* cited by examiner

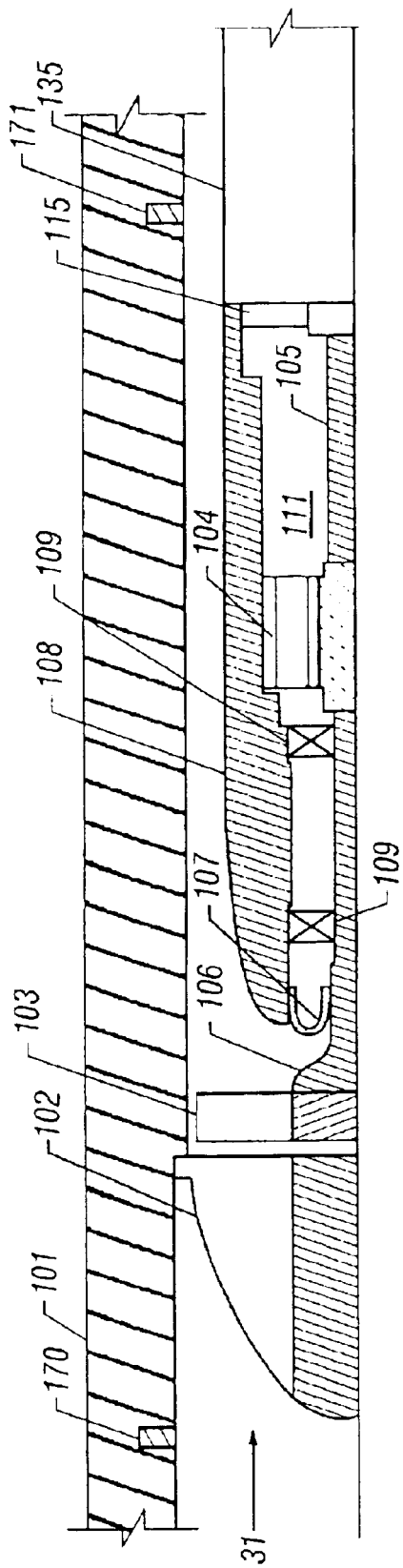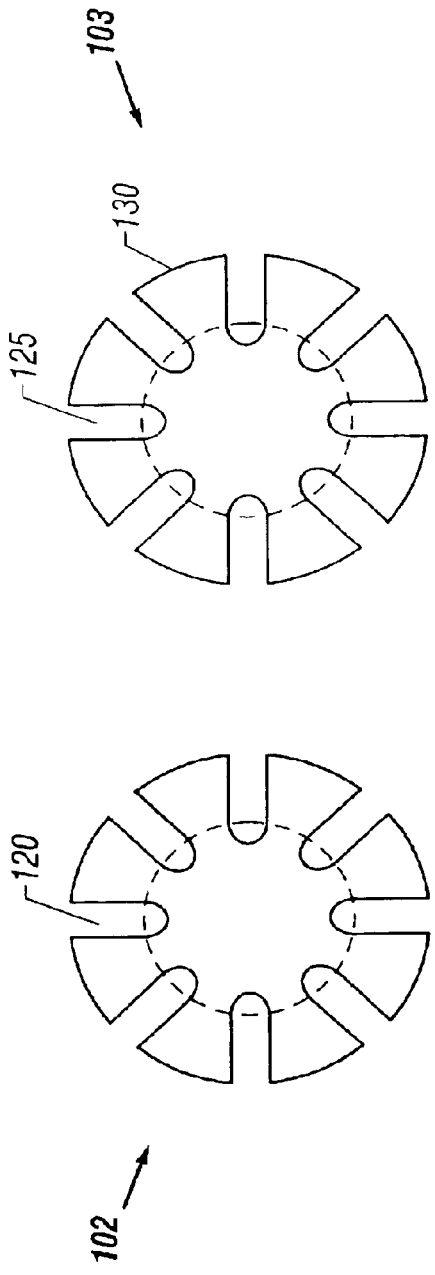
FIG. 2A
FIG. 2B
FIG. 2C

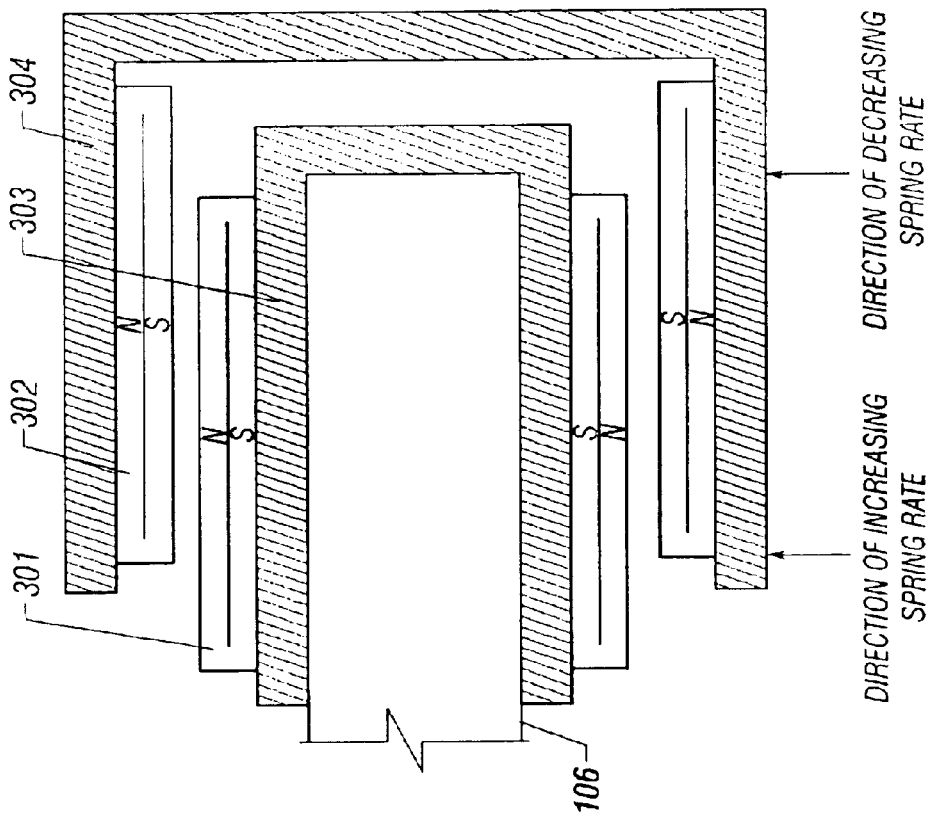
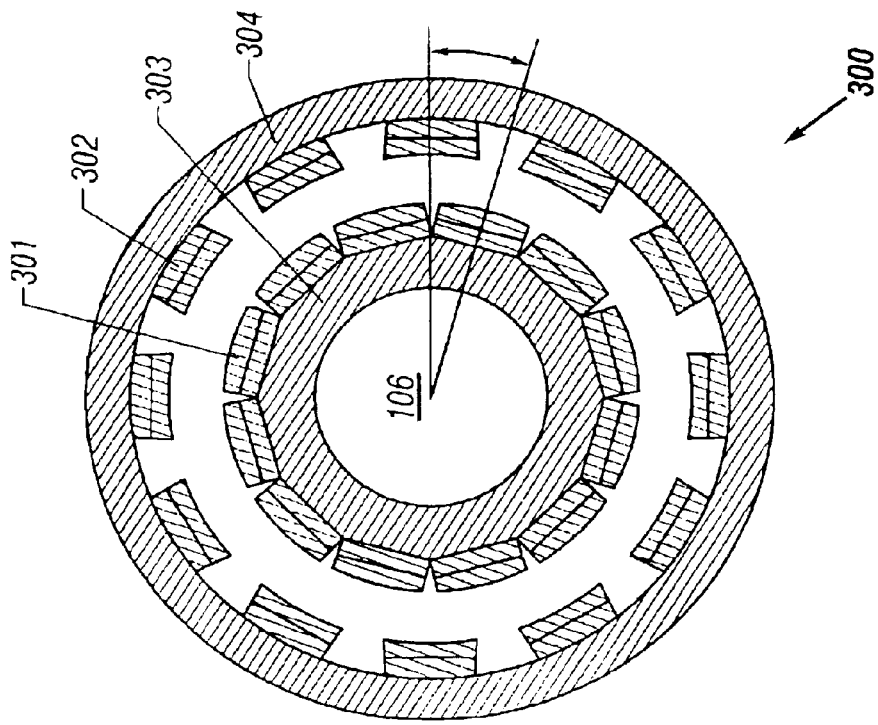
FIG. 3B
FIG. 3C

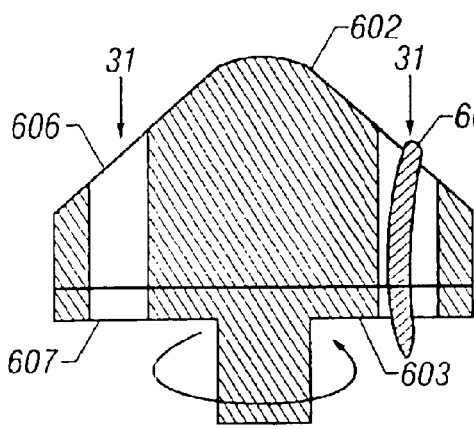 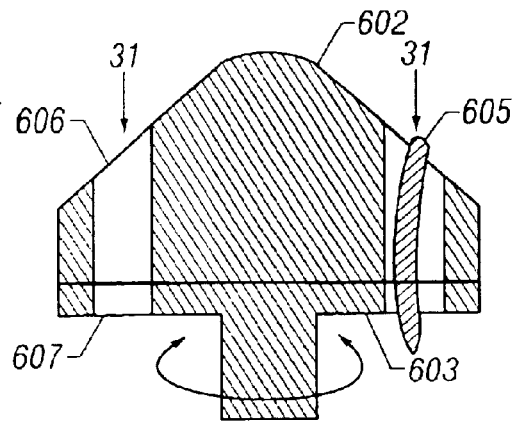
FIG. 6A  FIG. 6B
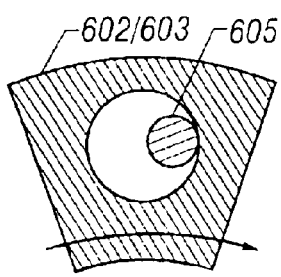 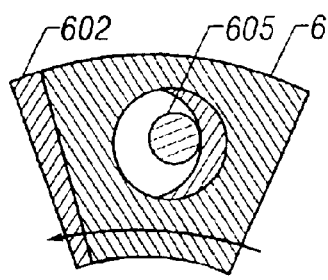 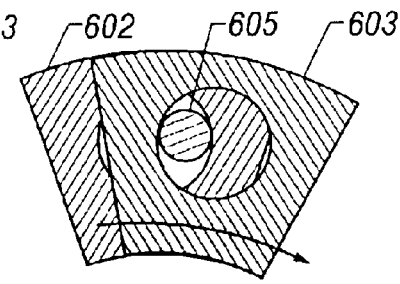
FIG. 6C-1  FIG. 6C-2  FIG. 6C-3
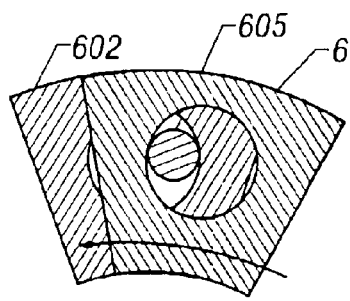 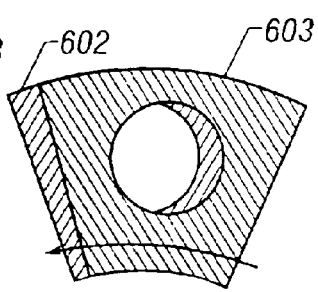 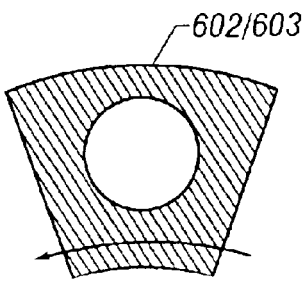
FIG. 6D-1  FIG. 6D-2  FIG. 6D-3

B-B

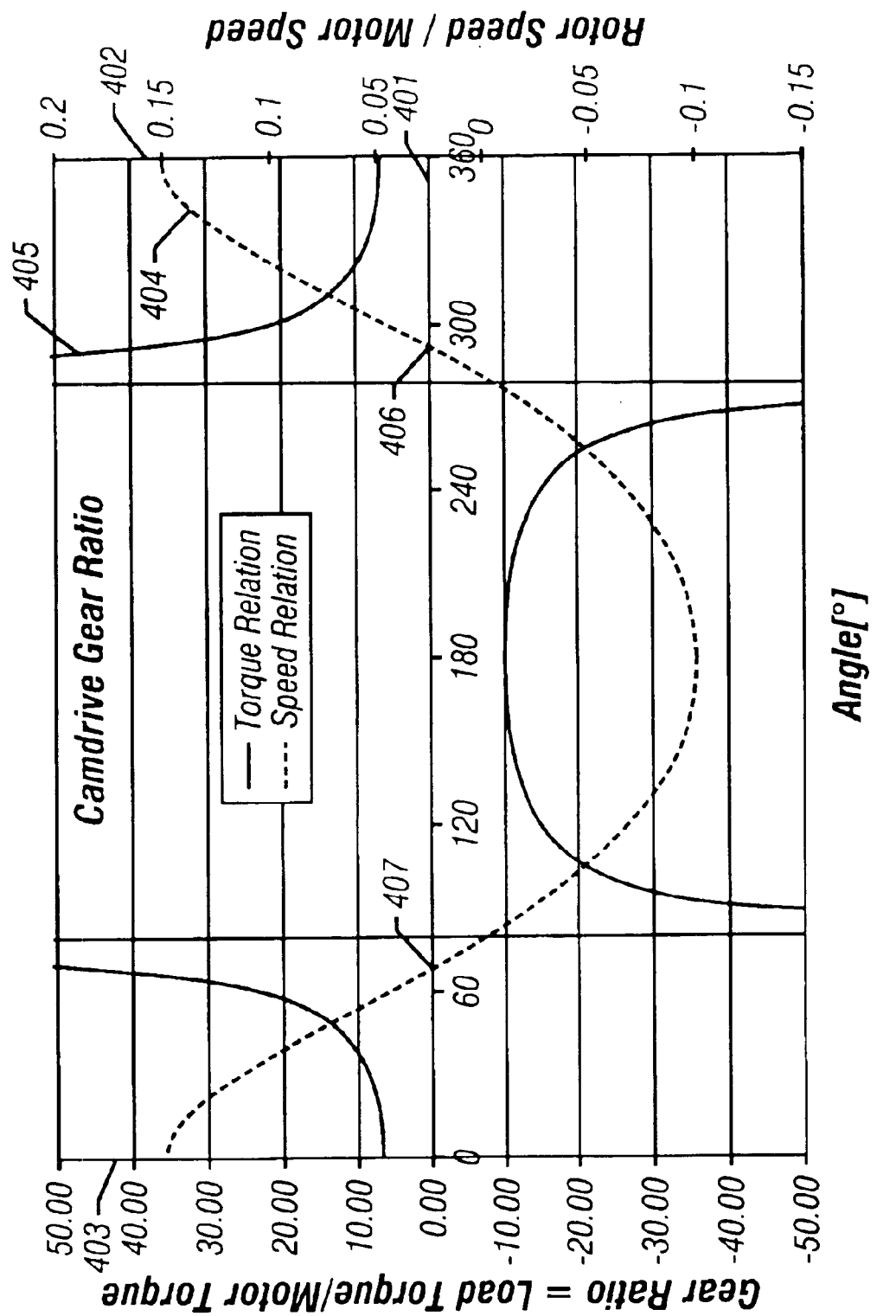

OSCILLATING SHEAR VALVE FOR MUD PULSE TELEMETRY AND ASSOCIATED METHODS OF USE

CROSS REFERENCE TO RELATED APPLICATIONS

The present application is a Continuation-in-Part of U.S. patent application Ser. No. 09/794,964 filed on Feb. 27, 2001 now U.S. Pat. No. 6,626,253.

BACKGROUND OF THE INVENTION

1. Field of the Invention

The present invention relates to drilling fluid telemetry systems and, more particularly, to a telemetry system incorporating an oscillating shear valve for modulating the pressure of a drilling fluid circulating in a drill string within a well bore.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameter include logging data such as resistivity of the various layers, sonic density, porosity, induction, self potential and pressure gradients. This information is critical to efficiency in the drilling operation.

Mud pulse valves must operate under extremely high static downhole pressures, high temperatures, high flow rates and various erosive flow types. At these conditions, the valve must be able to create pressure pulses of around 100–300 psi.

Different types of valve systems are used to generate downhole pressure pulses. Valves that open and close a bypass from the inside of the drill string to the wellbore annulus create negative pressure pulses, for example see U.S. Pat. No. 4,953,595. Valves that use a controlled restriction placed in the circulating mud stream are commonly referred to as positive pulse systems, for example see U.S. Pat. No. 3,958,217.

The oil drilling industries need is to effectively increase mud pulse data transmission rates to accomodate the ever increasing amount of measured downhole data. The major disadvantage of available mud pulse valves is the low data transmission rate. Increasing the data rate with available valve types leads to unacceptably large power consumption, unacceptable pulse distortion, or may be physically impractical due to erosion, washing, and abrasive wear. Because of their low activation speed, nearly all existing mud pulse valves are only capable of generating discrete pulses. To effectively use carrier waves to send frequency shift (FSK) or phase shift (PSK) coded signals to the surface, the actuation speed must be increased and fully controlled.

Another example for a negative pulsing valve is illustrated in U.S. Pat. No. 4,351,037. This technology includes a downhole valve for venting a portion of the circulating fluid from the interior of the drill string to the annular space between the pipe string and the borehole wall. Drilling fluids are circulated down the inside of the drill string, out through the drill bit and up the annular space to surface. By momentarily venting a portion of the fluid flow out a lateral port, an instantaneous pressure drop is produced and is detectable at the surface to provide an indication of the downhole venting. A downhole instrument is arranged to generate a signal or mechanical action upon the occurrence of a downhole detected event to produce the above described venting. The downhole valve disclosed is defined in part by a valve seat having an inlet and outlet and a valve stem movable to and away from the inlet end of the valve seat in a linear path with the drill string.

All negative pulsing valves need a certain high differential pressure below the valve to create sufficient pressure drop when the valve is open. Because of this high differential pressure, negative pulse valves are more prone to washing. In general, it is not desirable to bypass flow above the bit into the annulus. Therefore it must be ensured, that the valve is able to completely close the bypass. With each actuation, the valve hits against the valve seat. Because of this impact, negative pulsing valves are more prone to mechanical and abrasive wear than positive pulsing valves.

Positive pulsing valves might, but do not need to, fully close the flow path for operation. Positive poppet type valves are less prone to wear out the valve seat. The main forces acting on positive poppet valves are hydraulic forces, because the valves open or close axially against the flow stream. To reduce the actuation power some poppet valves are hydraulically powered as shown in U.S. Pat. No. 3,958,217. Hereby the main valve is indirectly operated by a pilot valve. The low power consumption pilot valve closes a flow restriction, which activates the main valve to create the pressure drop. The power consumption of this kind of valve is very small. The disadvantage of this valve is the passive operated main valve. With high actuation rates the passive main valve is not able to follow the active operated pilot valve. The pulse signal generated is highly distorted and hardly detectable at the surface.

Rotating disc valves open and close flow channels perpendicular to the flow stream. Hydraulic forces acting against the valve are smaller than for poppet type valves. With increasing actuation speed, dynamic forces of inertia are the main power consuming forces. U.S. Pat. No. 3,764,968 describes a rotating valve for the purpose to transmit frequency shift key (FSK) or phase shift key (PSK) coded signals. The valve uses a rotating disc and a non-rotating stator with a number of corresponding slots. The rotor is continuously driven by an electrical motor. Depending on the motor speed, a certain frequency of pressure pulses are created in the flow as the rotor intermittently interrupts the fluid flow. Motor speed changes are required to change the pressure pulse frequency to allow FSK or PSK type signals. There are several pulses per rotor revolution, corresponding to the number of slots in the rotor and stator. To change the phase or frequency requires the rotor to increase or decrease in speed. This may take a rotor revolution to overcome the rotational inertia and to achieve the new phase or frequency, thereby requiring several pulse cycles to make the transition. Amplitude coding of the signal is inherently not possible with this kind of continuously rotating device. In order to change the frequency or phase, large moments of inertia, associated with the motor, must be overcome, requiring a substantial amount of power. When continuously rotated at a certain speed, a turbine might be used or a gear might be included to reduce power consumption of the system. On the other hand, both options dramatically increase the inertia and power consumption of the system when changing from one to another speed for signal coding. Another advantage of the oscillating shear valve is the option to use more sophisticated coding schemes than just binary coding. With the fast switching speed and large bandwidth of the oscillating shear valve, multivalent codes are possible (e.g. three different conditions to encode the signal). The large bandwidth also enables the operator to use chirps and sweeps to encode signals.

The aforesaid examples illustrate some of the critical considerations that exist in the application of a fast acting valve for generating a pressure pulse. Other considerations in the use of these systems for borehole operations involve the extreme impact forces, dynamic (vibrational) energies, existing in a moving drill string. The result is excessive wear, fatigue, and failure in operating parts of the system. The particular difficulties encountered in a drill string environment, including the requirement for a long lasting system to prevent premature malfunction and replacement of parts, require a robust and reliable valve system.

The methods and apparatus of the present invention overcome the foregoing disadvantages of the prior art by providing a novel mud pulse telemetry system utilizing a rotational oscillating shear valve.

SUMMARY OF THE INVENTION

The present invention contemplates a mud pulse telemetry system utilizing an oscillating shear valve system for generating pressure pulses in the drilling fluid circulating in a drill string in a well bore. In one aspect of the invention, a mud pulse telemetry system comprises a drillstring having a drilling fluid flowing therein, where the drill string extends in a borehole from a drilling rig to a downhole location. A non-rotating stator is disposed in the flowing drilling fluid, the stator having a plurality of flow passages to channel the drilling fluid. A rotor is disposed in the flowing drilling fluid proximate the stator, the rotor having a plurality of flow passages. A motor driven gear system is adapted to drive the rotor in a rotationally oscillating manner for generating pressure fluctuations in the drilling fluid.

In another aspect, a method for providing a high data rate in a mud pulse telemetry system by generating a fast transition in a mud pulse telemetry multivalent encoding scheme, wherein the combination of an amplitude shift key encoding (ASK) scheme and a frequency shift key encoding scheme (FSK) comprises driving a rotor in an oscillatory periodic motion through at least one first predetermined rotational angle at at least one first frequency generating at least one first pulse amplitude at the at least one first frequency. A drive signal is changed to drive the rotor in an oscillatory periodic motion through at least one second predetermined rotational angle at at least one second predetermined frequency according to the multivalent encoding scheme. At least one second pulse amplitude at the at least one second frequency is attained in no more than one rotor oscillatory period.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein:

FIG. 2 is a schematic of an oscillating shear valve according to one embodiment of the present invention;

FIG. 3b is a schematic of a magnetic spring assembly according to one embodiment of the present invention;

FIG. 3c is a cross section view of the magnetic spring assembly of FIG. 3b;

FIG. 6a illustrates a continuously rotating shear valve;

FIG. 6b illustrates an oscillating shear valve according to one embodiment of the present invention;

FIG. 6c illustrates the jamming tendency of a continuously rotating shear valve;

FIG. 6d illustrates the anti-jamming feature of an oscillating shear valve according to one embodiment of the present invention;

FIG. 9D shows an example of a cam shaft gear torque vs. speed ratio according to one preferred embodiment of the present invention;

DESCRIPTION OF PREFERRED EMBODIMENTS

Figure 1:
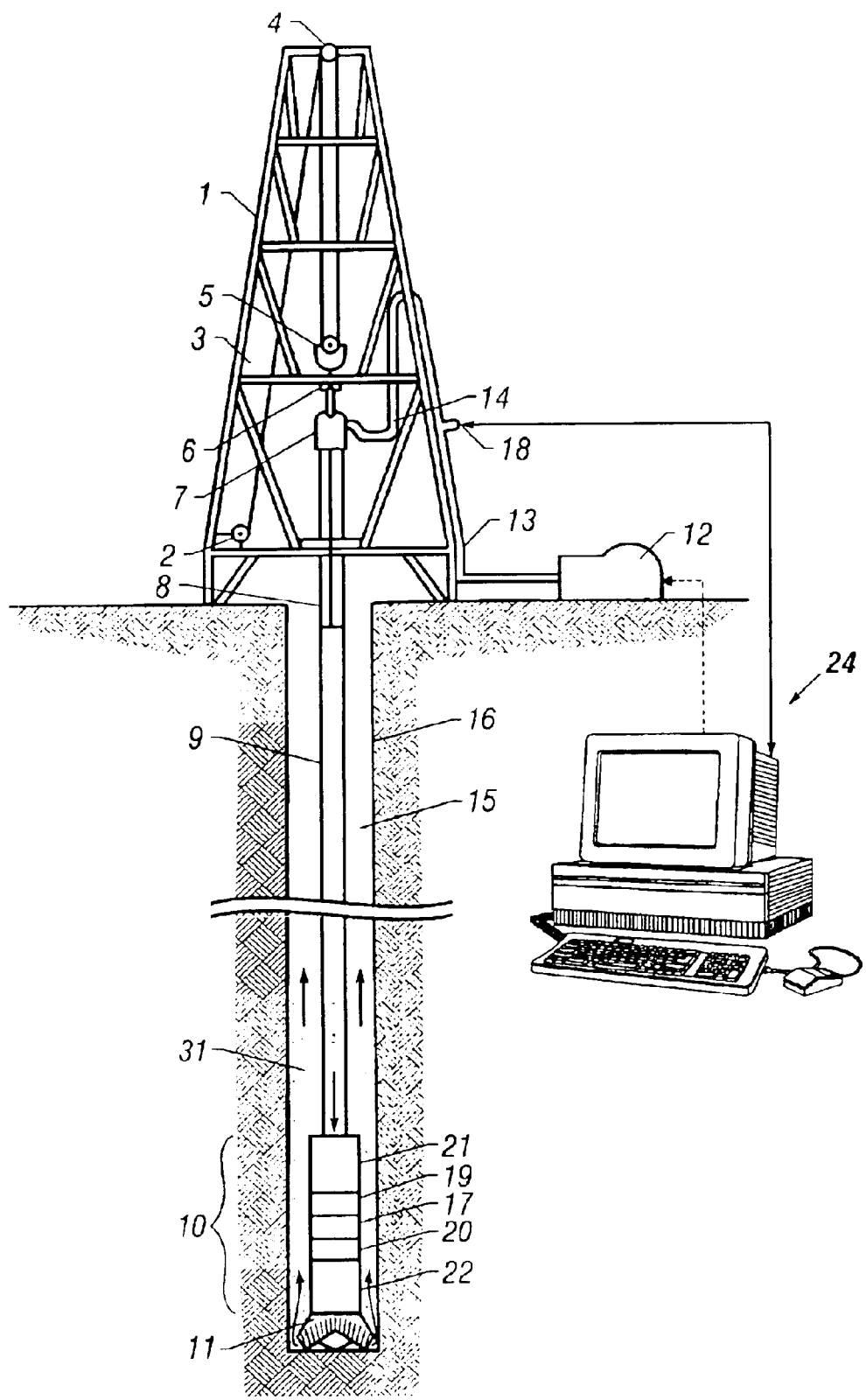
FIG. 1 is a schematic diagram showing a drilling rig engaged in drilling operations.

FIG. 1 is a schematic diagram showing a drilling rig 1 engaged in drilling operations. Drilling fluid 31, also called drilling mud, is circulated by pump 12 through the drill string 9 down through the bottom hole assembly (BHA) 10, through the drill bit 11 and back to the surface through the annulus 15 between the drill string 9 and the borehole wall 16. The BHA 10 may comprise any of a number of sensor modules 17, 20, 22 which may include formation evaluation sensors and directional sensors. These sensors are well known in the art and are not described further. The BHA 10 also contains a pulser assembly 19 which induces pressure fluctuations in the mud flow. The pressure fluctuations, or pulses, propagate to the surface through the mud flow in the drill string 9 and are detected at the surface by a sensor 18 and a control unit 24. The sensor 18 is connected to the flow line 13 and may be a pressure transducer, or alternatively, may be a flow transducer.

FIG. 2a is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

The stator 102, see FIGS. 2a and 2b, is fixed with respect to the tool housing 101 and to the pulser housing 108 and has multiple lengthwise flow passages 120. The rotor 103, see FIGS. 2a and 2c, is disk shaped with notched blades 130 creating flow passages 125 similar in size and shape to the flow passages 120 in the stator 102. Alternatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103 is. As an example, with eight flow openings on the rotor 103 and on the stator 102, an angular displacement of approximately 22.5° is used to create the pressure drop. This keeps the actuation energy relatively small at high pulse frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), or Phase Shift Keying (PSK) or the combination of these techniques.

In one preferred embodiment, the tool housing 101 has pressure sensors, 170 and 171 mounted in locations above and below the pulser assembly, with the sensing surface exposed to the fluid in the drill string bore. These sensors are powered by the electronics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In a preferred embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate preferred embodiment, the seal 107 may be an elastomeric rotating shaft seal or a mechanical face seal.

In a preferred embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

Figure 3A:
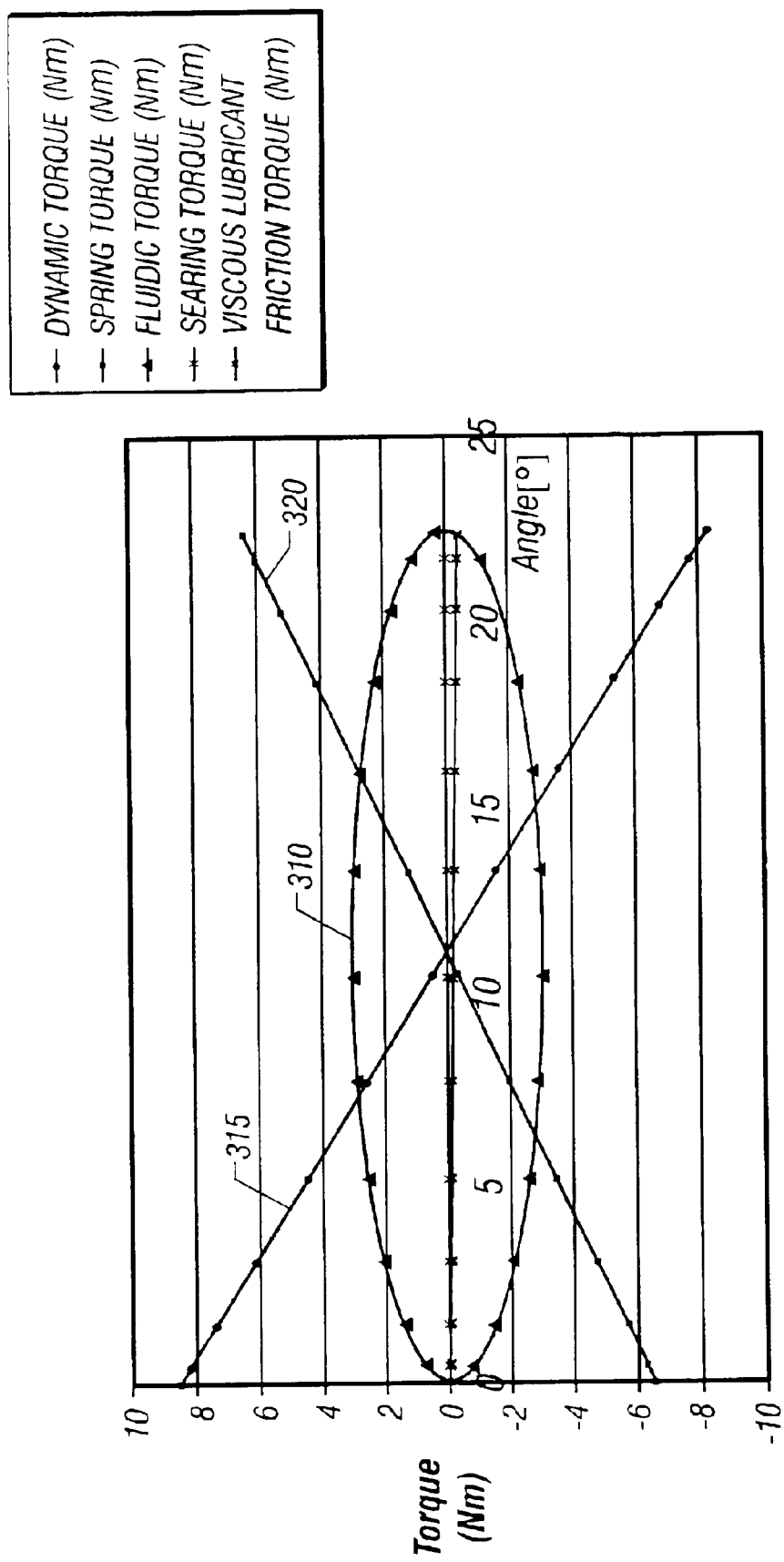
FIG. 3a is a schematic of a typical torque signature acting on an oscillating shear valve according to one embodiment of the present invention.
Figure 3D:
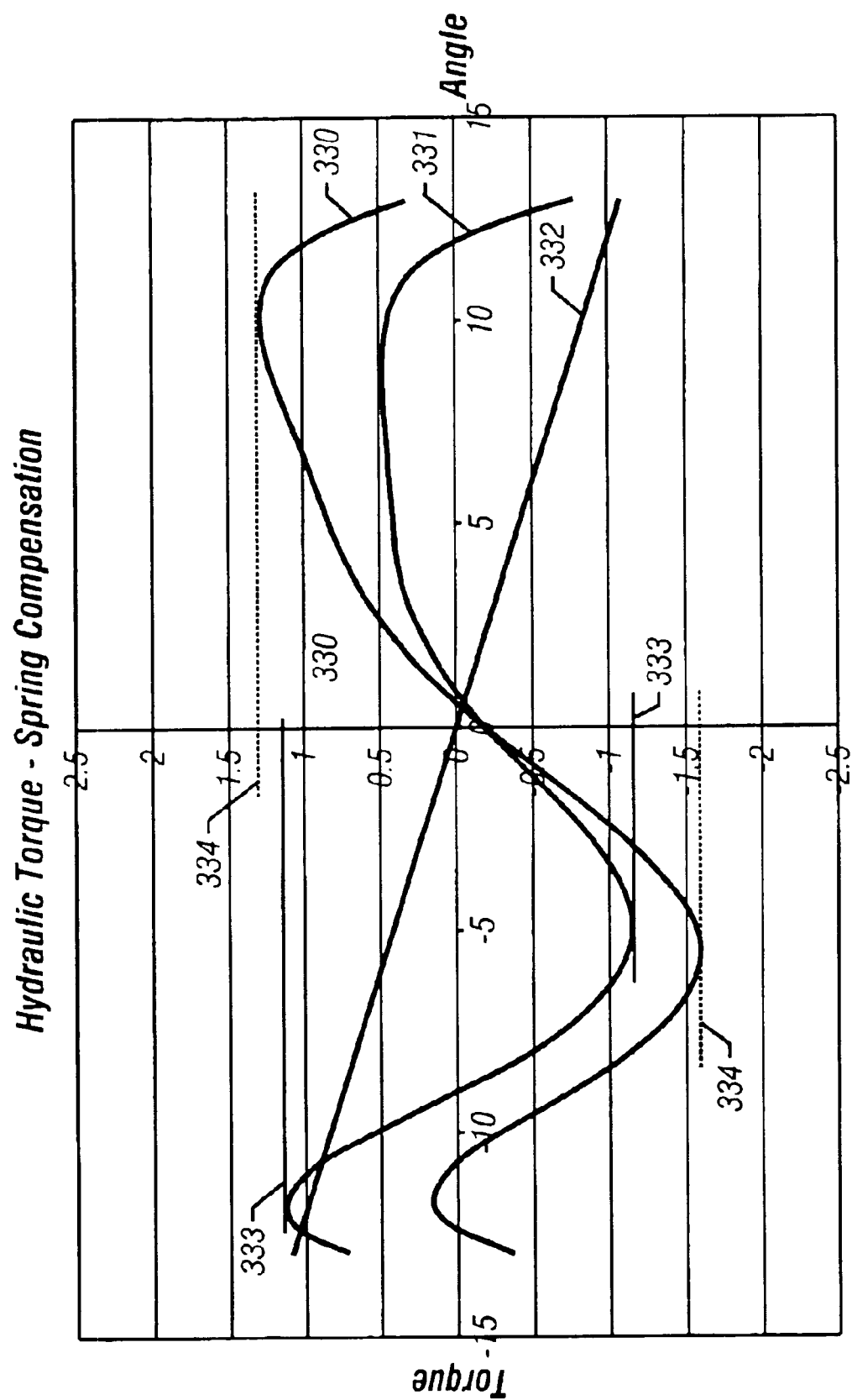
FIG. 3d is a schematic of a shaped torque profile according to one embodiment of the present invention.

FIG. 3a shows a typical torque signature acting on an oscillating shear valve. The torque acting on the rotating disc is subdivided into three main parts, the torque due to the fluid force 310, the dynamic torque caused by the inertia and acceleration 315, and the counterbalancing spring torque 320 (example is taken for 40 Hz). If the dynamic torque 315 and the spring torque 320 are added, the spring torque 320 will cancel out most of the dynamic torque 315 and essentially only the fluidic torque 310 remains.

In an alternative preferred embodiment, the spring, that is primarily designed to cancell out the dynamic torque at high oscillating frequencies, is also used to cancel a portion of the fluidic torque at low oscillating frequencies. FIG. 3c shows another example of a the hydraulic torque 330 acting on the valve. In this case the valve is designed in a way that results in a hydraulic torque, that can be compensated with a spring. As shown, the shaped hydraulic valve torque 330 is partly compensated 331 by the spring torque 332. The maxima 333 of the compensated curve 331 are smaller than the maxima 334 of the orignal hydraulic torque 330. The spring can therefore serve to balance the inertia forces at higher frequencies and to compensate hydraulic forces at low frequencies.

In an alternative preferred embodiment, the spring used in the spring-mass system is a magnetic spring assembly 300, as shown in FIG. 3b. The magnetic spring assembly 300 comprises an inner magnet carrier 303 being rigidly coupled to the shaft 106, inner magnets 301 fixed to the inner magnet carrier 303, and an outer magnet carrier 304, carrying the outer magnets 302. The outer magnet carrier 304 is mounted to the pulser housing 108. The outer magnet carrier 304 is adapted to be moved in the axial direction with respect to the tool axes, while remaining in a constant angular position with respect to the pulser housing 108. The magnetic spring assembly 300 creates a magnetic torque when the inner magnet carrier 303 is rotated with respect to the outer magnet carrier 304. Using an appropriate number of poles (number of magnet pairs) it is possible to create a magnetic spring torque which counterbalances the dynamic torques of the rotor 103, the shaft 106, the bearings 108, the inner magnet carrier 303, and the motor 104. With axial displacement of the outer magnet carrier 304 with respect to the inner magnet carrier 303, the magnetic spring rate and, therefore, the spring-mass natural frequency can be adjusted such that this spring-mass system is at its natural frequency at, or near, the desired oscillating pulse frequency of the pulser.

The above described rotor drive system provides precise control of the angular position of the rotor 103 with respect to the position of the stator 102. Such precise control allows the improved use of several encoding schemes common to the art of mud pulse telemetry.

In contrast to an axial reciprocating flow restrictor, the torque to drive a flow shear valve is not as dependent on the pressure drop being created. Hence the power to drive a shear valve at the same frequency and the same pressure drop is lower. Commonly used rotational shear valves that rotate at a constant speed consume relatively low power when operating at a constant frequency. A high power peak is required when those devices switch from one frequency to a second frequency, for example in an FSK system. With the oscillating spring mass system, the encoding or switching between phase/frequency/amplitude does not require a high actuation power, because the speed is always zero when the valve is fully closed or open. Starting from the zero speed level a phase/frequency/amplitude change does not substantially affect the overall power consumption. In a preferred embodiment of the shear valve, the main power is used to drive the system at a high frequency level. Once it is capable of creating a high frequency it can switch to another one almost immediately. This quick change gives a very high degree of freedom for encoding of telemetry data. The characteristic used for the encoding (frequency, phase or amplitude change) can be switched from one state to a second state, thereby transmitting information, within one period or less. No transition zone is needed between the different levels of encoded information. Hence there will be more information content per time frame in the pressure pulse signal of the oscillating shear valve than with a conventional shear valve system.

In another embodiment, the encoding characteristic change is initiated at any rotor position, with the new state of phase, frequency, or amplitude still achieved within one oscillating period.

Figure 4:
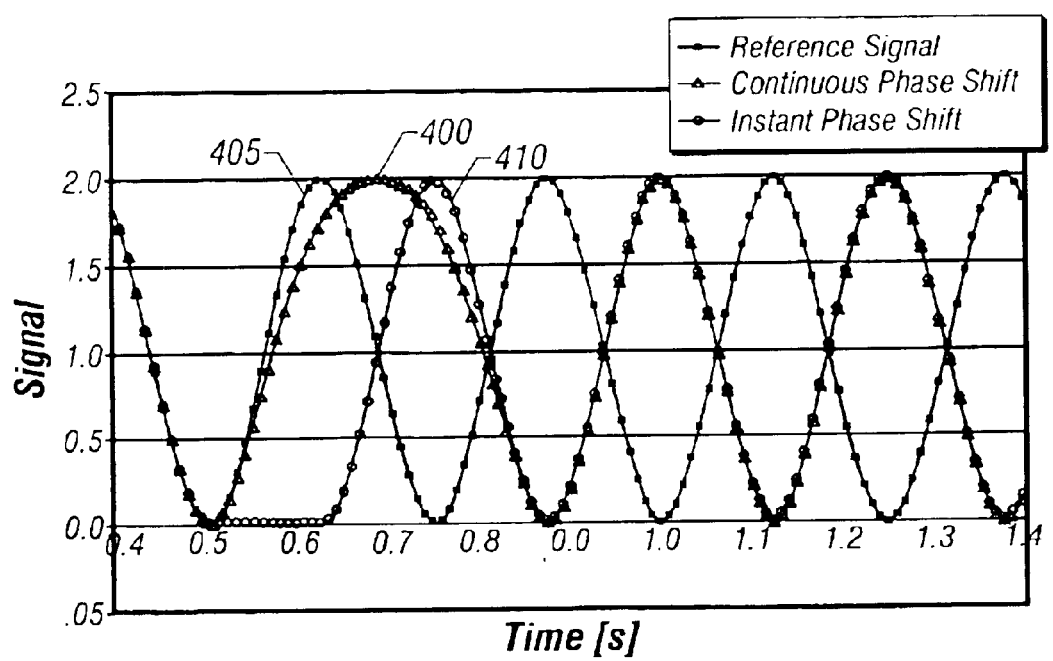
FIG. 4 is schematic which describes Phase Shift Key encoding using an oscillating shear valve according to one embodiment of the present invention.

FIG. 4 displays a graph which shows Phase Shift Key encoding of the oscillating shear valve as compared to a continuously rotating shear valve. The continuous phase shift signal 400 requires 1½ signal periods of the reference signal 405 to achieve a fill 180° phase shift. In the transition time between 0.5 s and 0.9 s the information of the continuous phase shift signal 400 can not be used because it contains multiple frequencies. With the oscillating shear valve, the DC motor allows the rotor to be started at essentially any time thereby effectively providing an essentially instant phase shift. As shown in FIG. 4, the oscillating shear valve phase shift signal 410 starts at 0.5 s already in the proper phase shifted relationship with the reference signal 400 such that the following signal period can already be used for encoding purposes. Thus, there is more information per time frame with a phase shift keying signal generated with an angular oscillating shear valve than with a continuously rotating shear valve.

Figure 5:
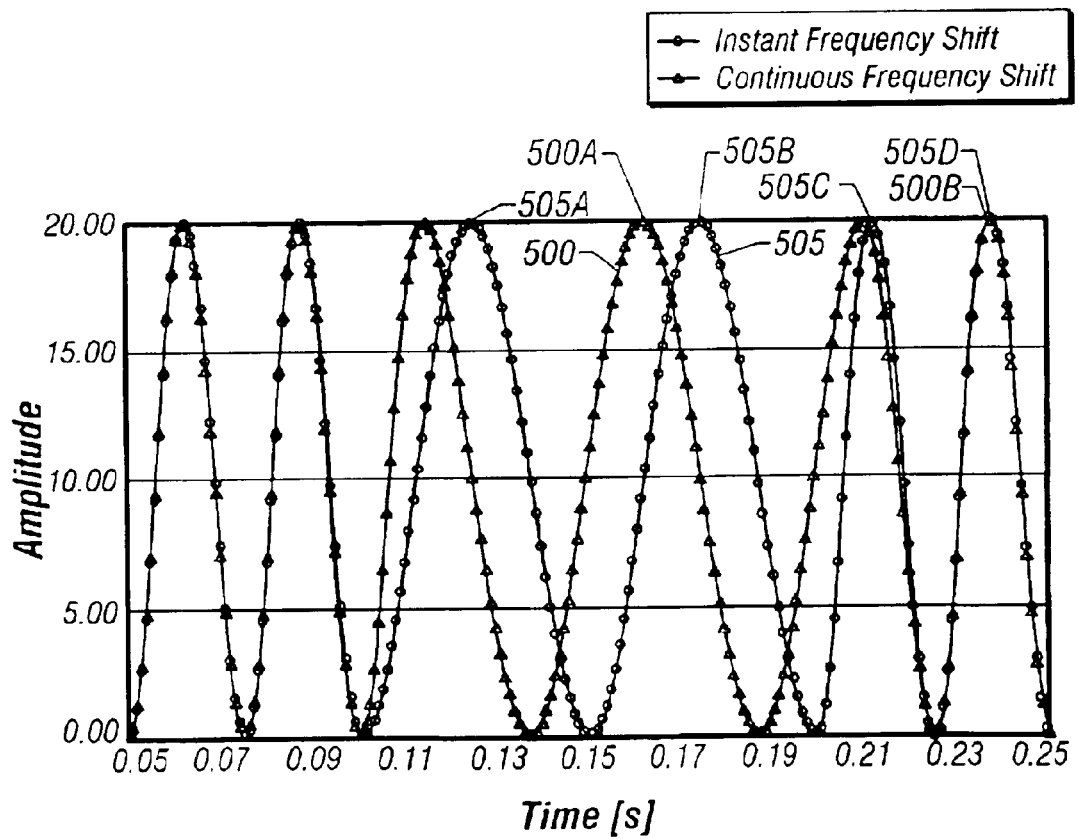
FIG. 5 is a schematic which describes Frequency Shift Key encoding using an oscillating shear valve according to one embodiment of the present invention.

FIG. 5 displays a graph showing a Frequency Shift Keying signal of the angular oscillating shear valve compared to a signal of a continuously rotating shear valves using the same encoding scheme. This example shows a frequency shift from 40 Hz to 20 Hz and back to 40 Hz. At 0.10 s the frequency is shifted from 40 Hz to 20 Hz, with the signal 500 from the continuously rotating shear valve, shifting only one full amplitude 500a of the low frequency at 0.16 s before it must shift back to the high frequency signal at 500b. Only the peaks at 500a and 500b are suitable for encoding information. The transition periods before and after the frequency shift contain multiple frequencies which can not be used for coding purposes. With the signal 505 from the angular oscillating shear valve, there are still two fully usable amplitudes 505a and 505b at the lower frequency and two usable peaks at the higher frequency 505c and 505d. As with phase shift keying, there is more information content per time frame with the angular oscillating shear valve than with a continuously rotating shear valve. This can provide higher detection reliability by providing more cycles to lock onto, or alternatively the frequency changes can be more rapid, thereby increasing the data rate, or a combination of these.

An Amplitude Shift Key (ASK) signal can be easily generated with the oscillating shear valve of the present invention. The signal amplitude is proportional to the amount of flow restriction and thus is proportional to the amount of angular rotation of the rotor 103. The rotor rotation angle can be continuously controlled and, therefore, the amplitude of each cycle can be different as the motor 104 can accurately rotate the rotor 103 through a different angular rotation on each cycle according to programmed control from the electronics module 135.

Figure 7:
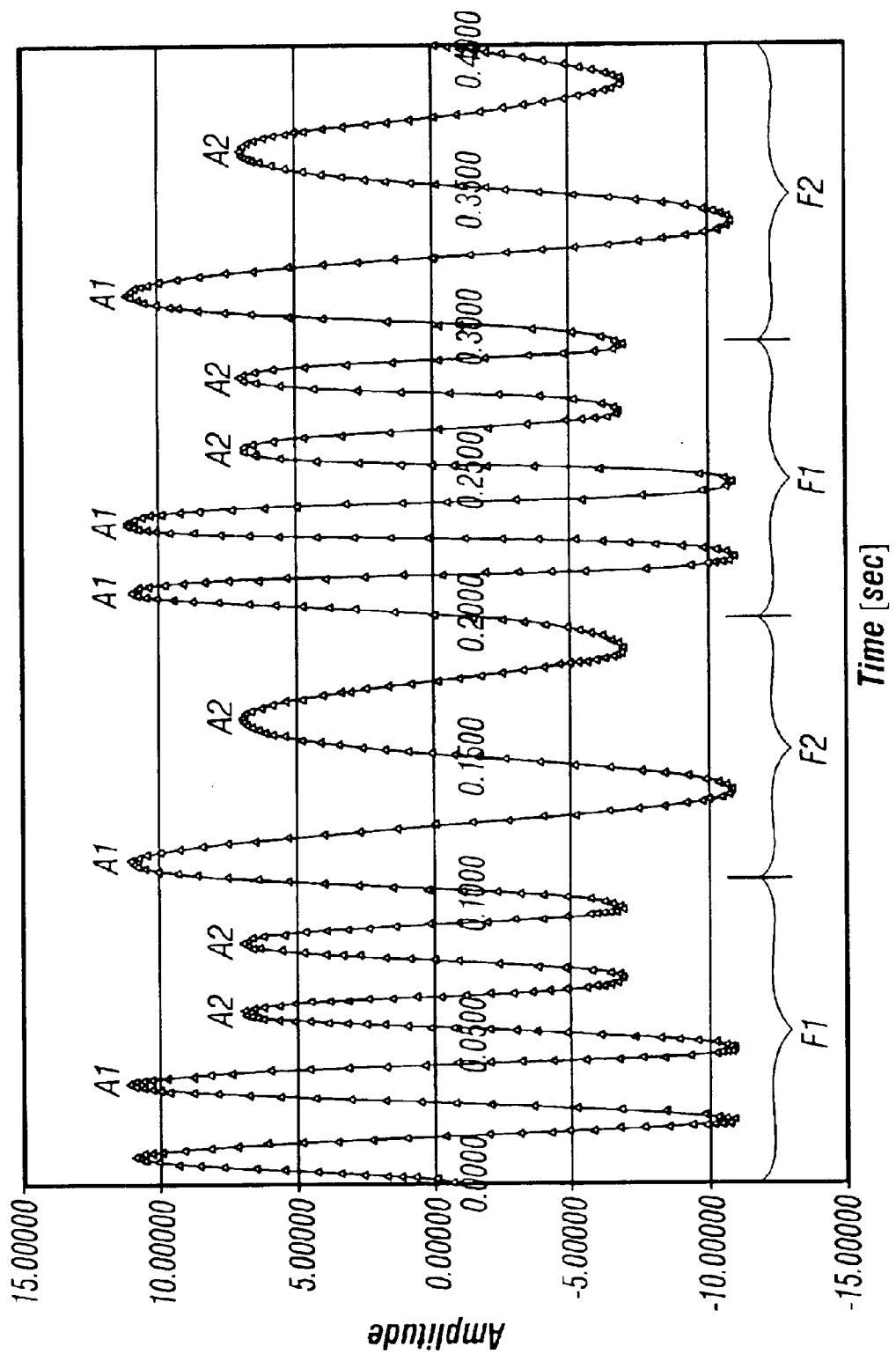
FIG. 7 is a schematic which describes a combination of a Frequency Shift Key and an Amplitude Shift Key encoding using an oscillating shear valve according to one embodiment of the present invention.

In addition, because the rotor can be continuously and accurately controlled, combinations of ASK and FSK or ASK and PSK may be used to encode and transmit multiple signals at the same time, greatly increasing the effective data rate. FIG. 7 is a schematic showing one scheme for combining an ASK and an FSK encoded signal. Both signals are carried out in a constant phase relationship with an amplitude shift from A1 to A2 or from A2 to A1 representing data bits of a first encoded signal and the frequency shifts from F1 to F2 or from F2 to F1 representing data bits of a second encoded signal. This type of signal is generated by changing both the oscillating frequency of the rotor and simultaneously changing the rotor oscillation angle, as previously described. Similarly, a signal combining ASK and PSK encoding (not shown) can be generated by changing the phase relationship of a constant frequency signal while simultaneously changing the amplitude by changing the rotor oscillation angle. Here, the amplitude shifts represent a first encoded signal and the phase shifts represent a second encoded signal.

One problem for rotating valves used in a drill string is plugging the valve during operation, for example, with either lost circulation materials or foreign bodies in the flow stream. FIGS. 6a–6d illustrates the anti-plugging feature of the angular oscillating shear valve as contrasted to a continuously rotating shear valve. FIGS. 6a and 6b show a continuously rotating shear valve and an oscillating shear valve, respectively. A rotor 603 rotates below a stator 602. Rotor 603 and stator 602 have a plurality of openings 607 and 606, respectively serving as a flow channels. Because of the rotor rotation, the flow channel is open when the flow channels 606 and 607 are aligned and the flow channel is closed when the both flow channels 606 and 607 are not aligned. A continuously rotating shear valve opens and closes the flow passage only in one rotational direction as seen in FIG. 6a. An angular oscillating valve opens and closes the flow passage by alternating the rotational direction as illustrated in FIG. 6b. A foreign body 605 enters and traverses a flow passage in both the stator 602 and the rotor 603. FIG. 6c demonstrates that the continuously rotating shear valve jams the foreign body between the rotor 603 and the stator 602, and fails to continue to rotate, possibly requiring the downhole tool to be retrieved to the surface for maintenance. However, an oscillating shear valve, as illustrated in FIG. 6d, opens the valve again in the opposite direction during its standard operation. The flow channel recovers to its full cross section area and the foreign body 605 is freed, and the valve continues to operate.

Figure 8A:
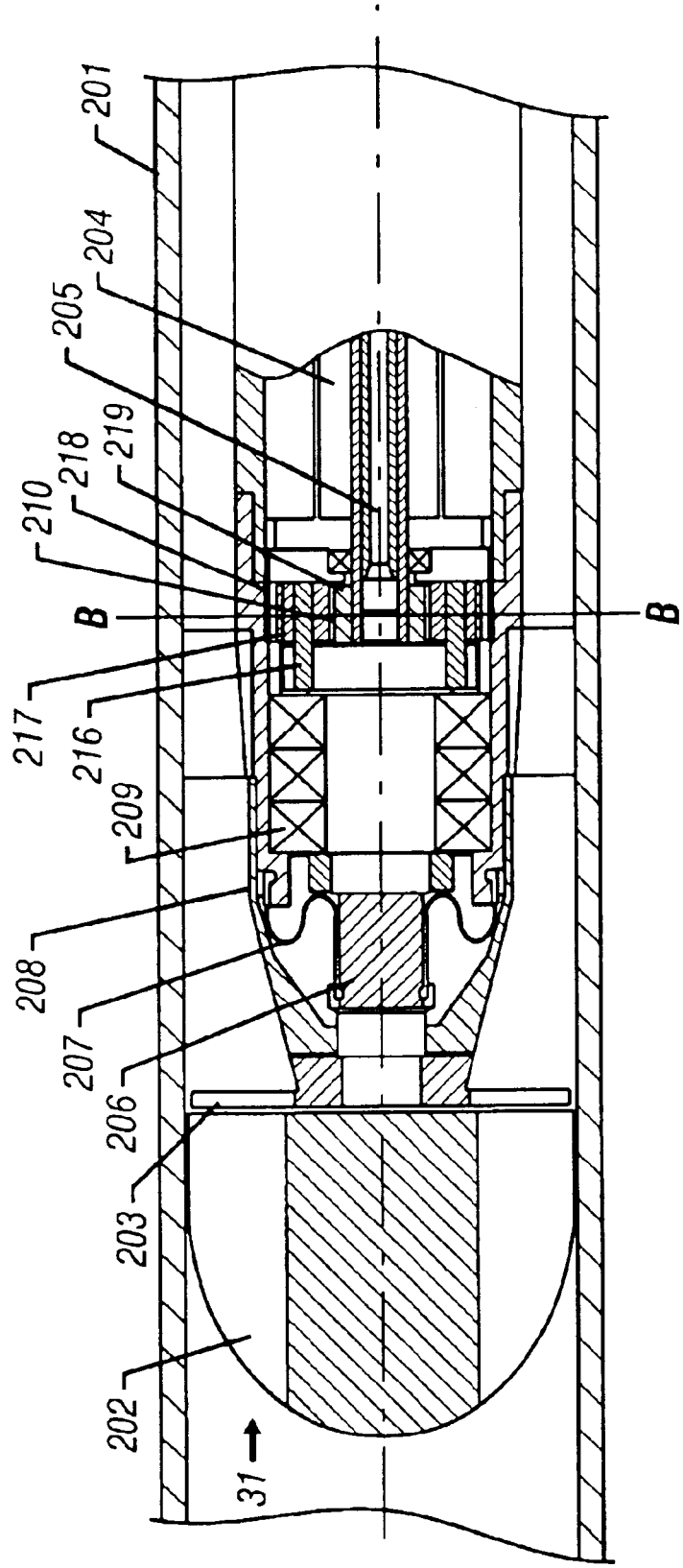
FIG. 8A is a schematic of an oscillating shear valve incorporating a motor-gear system combination for oscillating the shear valve rotor according to one preferred embodiment of the present invention.

FIGS. 8A, B show another preferred embodiment, similar to that of FIG. 2 but incorporating a commonly known type of gear system 210 between the shaft 206 and the motor 204. Preferably the gear system 210 is a planetary gear arrangement. The motor 204 is connected to the sun wheel 219 (high speed) of the gear system 210. The shaft 206 is connected to multiple satellite wheels 217 (low speed) of the gear system 210. The torsion spring 205 is connected to shaft 206 and end cap (not shown). Alternatively, the torsion spring 205 may be connected to motor 204. If the spring 205 is connected to shaft 206, smaller spring torsion angles are required than connecting the spring to the motor 204. Depending on the selected gear ratio, the high speed—and low speed driven side can also be reversed. The annular gear 218 of the gear system 210 is fixed to the pulser housing 208.

Figure 8B:
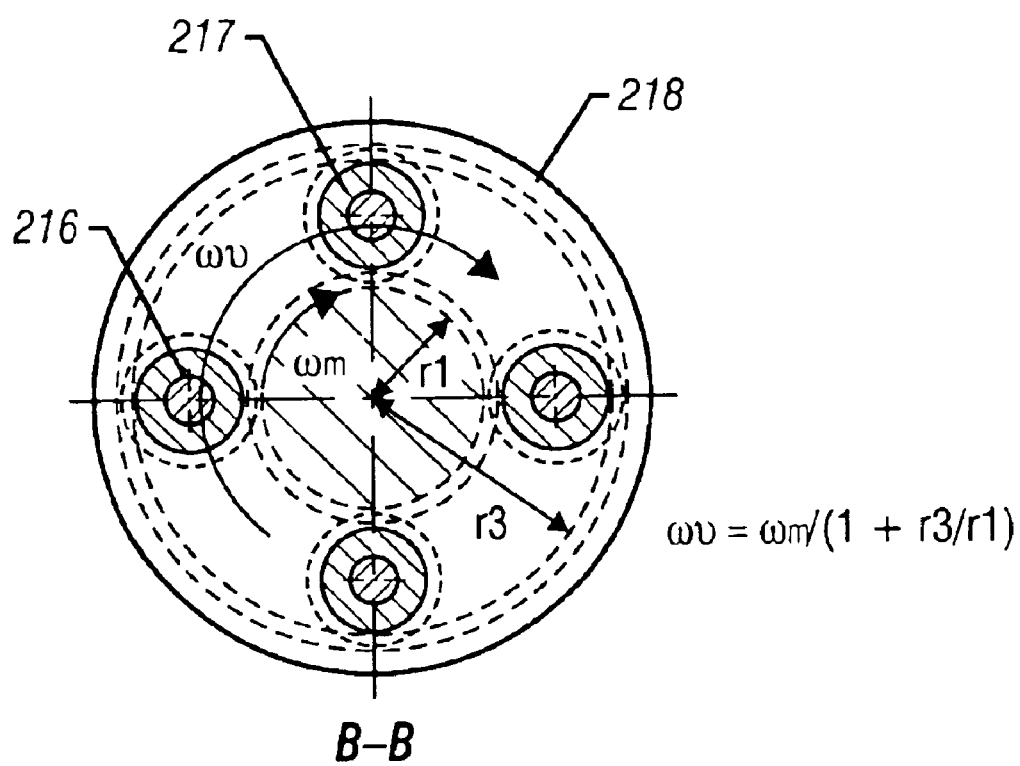
FIG. 8B is a section view through the gear system of FIG. 8A.

FIG. 8B is a section view through the gear system 210 of FIG. 8A, showing a planetary gear arrangement with 4 satellites 217. It is obvious to one skilled in the art, that also other gear systems arrangements are possible. The gear ratio of such a planetary gear arrangement is given by $Speed_{rotor}=Speed_{Motor}/1(Radius_{Annulargear}/Radius_{Sungear})$ where the rotor 203 is directly coupled to the shaft 206. The gear system 210 allows more precise control of rotor 203 rotation. The motor shaft rotates more than the rotor 203 as determined by the gear ratio. By controlling the motor shaft angular position, the rotor 203 position can be controlled to a higher precision as related by the gear ratio. To keep the power demands of the pulser as small as possible, the gear ratio is optimized in regards to the spring-mass system and the inertias of the drive—and load side.

Figure 8C:
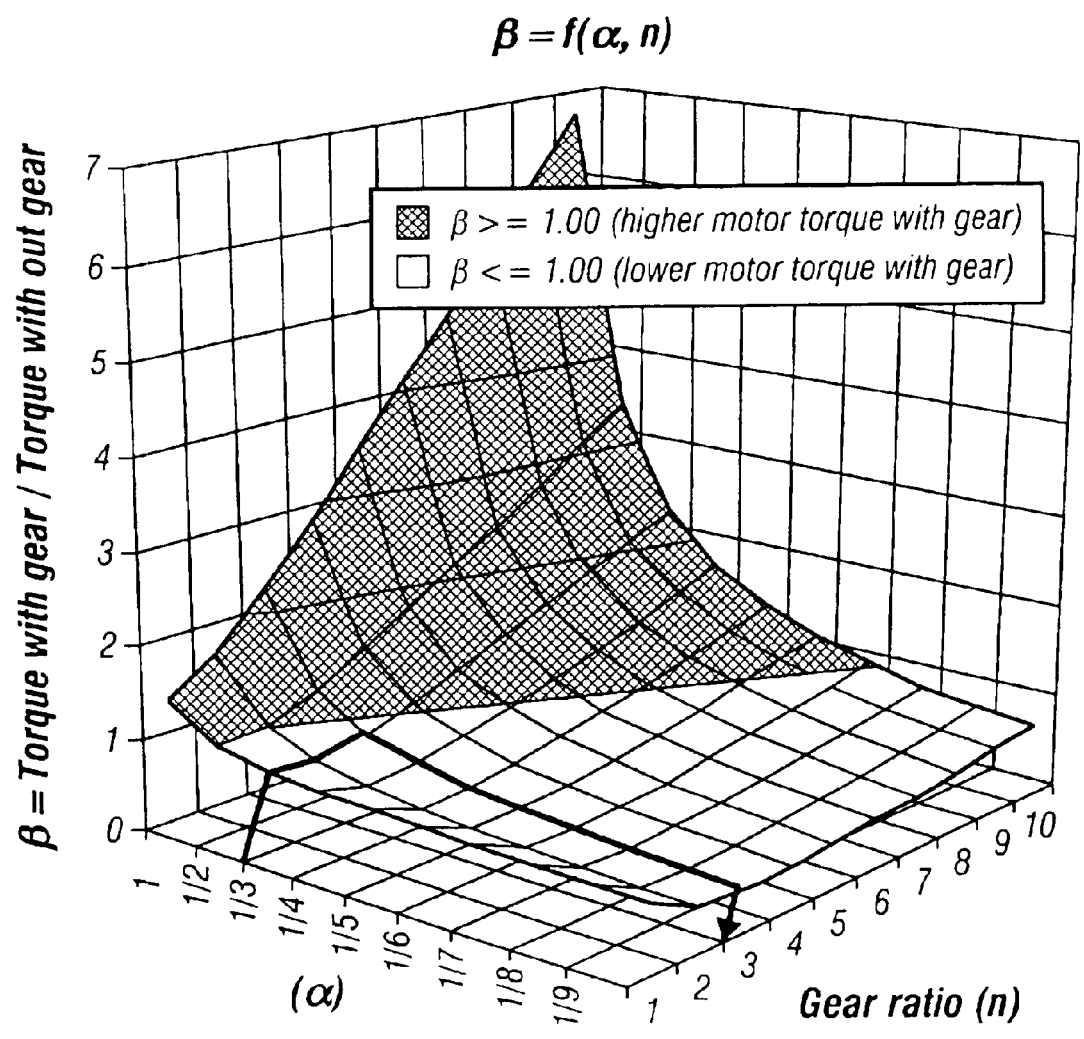
FIG. 8C is a schematic showing the torque limits for a motor driven—versus a motor-gear driven system.

FIG. 8C shows a 3-dimensional plot based on a spring-mass system driven by a motor/gear combination. The plot is based on keeping the natural frequency of the spring-mass system constant for all shown combinations. Gear inertia and friction are neglected to simplify the model and to ease understanding. The plot shows the relation $\beta=T_M/T_{MO}$ (motor torque with gear/motor torque without gear) versus gear ratio "n" (motor speed/rotor speed) and inertia ratio $\alpha=J_M/J_L$ (motor inertia to load inertia). The line, which separates the dark—and bright gray areas, is the line of equal motor torque. Using a gear above this line (dark grey area) will result in an unfavorably large motor torque, when the spring-mass system is oscillating. The plot shows, that for the given system only a certain gear ratio is advantageous. An example is shown by following the arrow on the chart. If the load-inertia is three times bigger than the motor-inertia, the gear ratio should not exceed 3 to avoid higher power consumption of the pulser due to using a gear system as compared to a pulser without the gear system.

Figure 9A:
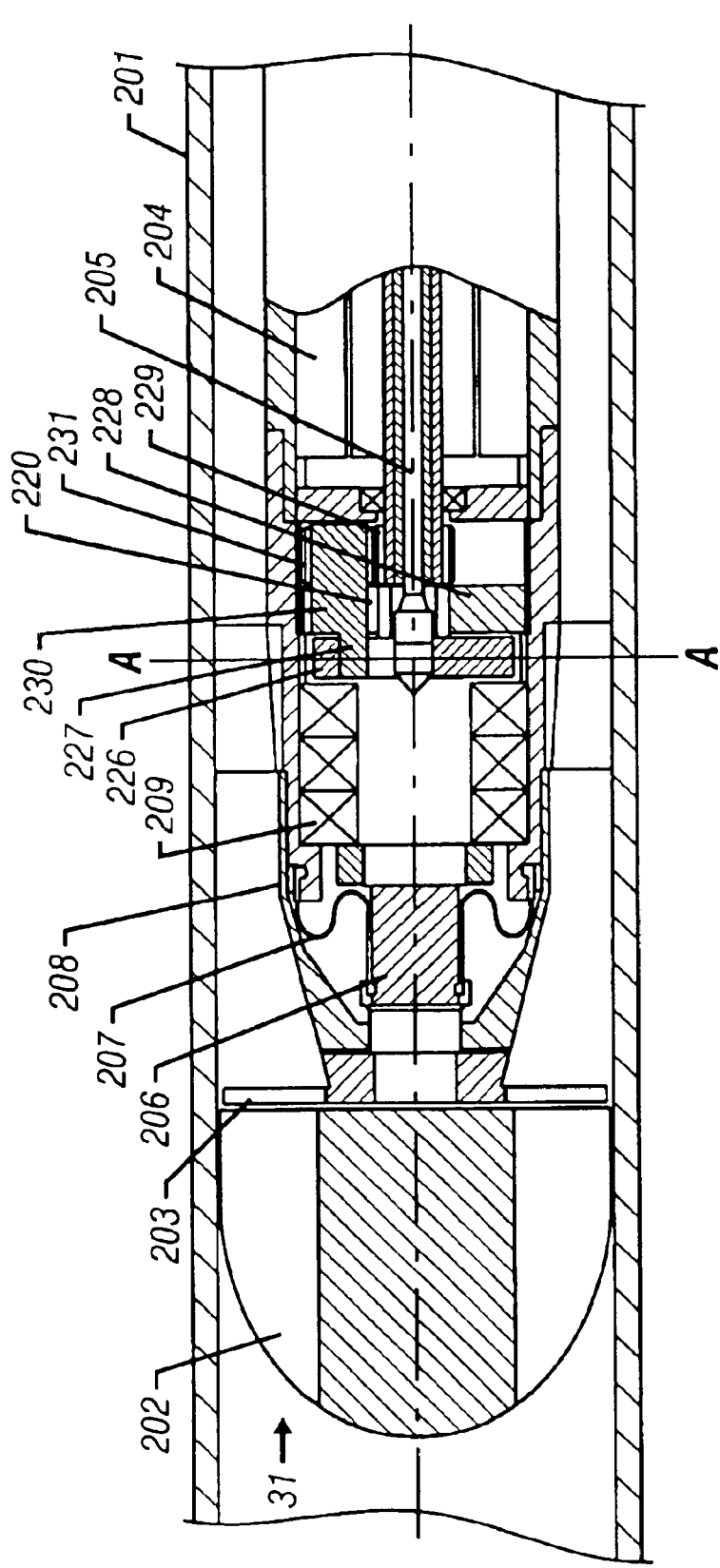
FIG. 9A is a schematic of an oscillating shear valve incorporating a motor-cam shaft gear combination according to one preferred embodiment of the present invention.

FIG. 9A shows another preferred embodiment similar to that described in FIG. 8A incorporating a cam, or crank, shaft system 220 between the shaft 206 and the motor 204. Two preferred operating modes are possible with such a system. In one preferred embodiment, the gear system transmits oscillating(rotating back and forth) motor 204 movements into oscillating rotor 203 movements. Alternatively, continuous motor 204 rotation may be converted into oscillating rotor 203 movements.

The system 220 features two gears 229, 231 and crank shaft 226. Crank shaft 226 is fixed to shaft 206. Drive gear 229 is positioned on motor shaft 204 and drives the secondary gear 231 fixed on drive shaft 230. Bearings (not shown) to keep the drive shaft 230 in position are incorporated into support plate 228. Support plate 228 is fixed to pulser housing 208. Drive shaft 230 features on it's opposite end an eccentric displaced drive pin 227. Drive pin 227 reaches into a slot of crank shaft 226.

Figure 9B:
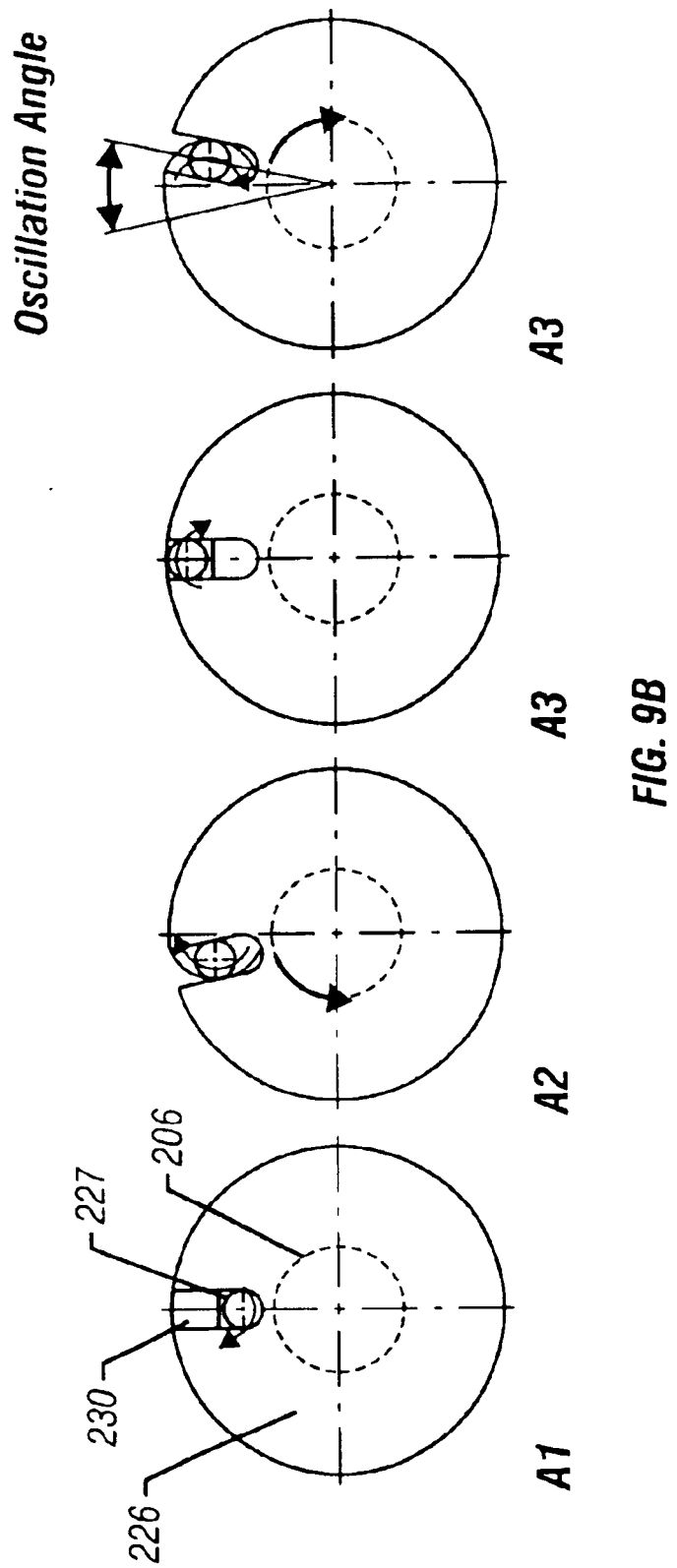
FIG. 9B is a section view through the gear system section of FIG. 9A.

FIG. 9B shows an example of the crank shaft gear system 220 movement. Driven by the electrical motor 204, drive shaft 230 and drive pin 227 are continuously rotated. Drive pin 227 rotates eccentrically around the axes of drive shaft 230. Due to the eccentric movement of drive pin 227, crank shaft 226 is forced to the left and to the right hand side, oscillating around the axes of shaft 206. The oscillation angle of shaft 206 is related to the eccentricity and diameter of drive pin 227 and the distance between the axes of drive shaft 230 and shaft 206. Alternatively, for an oscillating motor 204 movement (instead of rotating motor movement), the oscillation angle of shaft 206 is, in addition to above mentioned geometrical parameters, also related to the oscillation angle of motor 204. While the system is moving, the effective gear ratio is continuously changing depending on selected drive pin eccentricity, distance between axes of shaft 206 to drive pin 226, and the gear ratio between drive gear 229 and secondary gear 231. Practically a gear ratio of 1 to 6 may be realized in the design space of a common tool size. It is obvious to someone skilled in the art that other common cam shaft gears or crank shaft gears might be used to transmit a continuous motor rotation into an oscillating rotor movement.

Figure 9C:
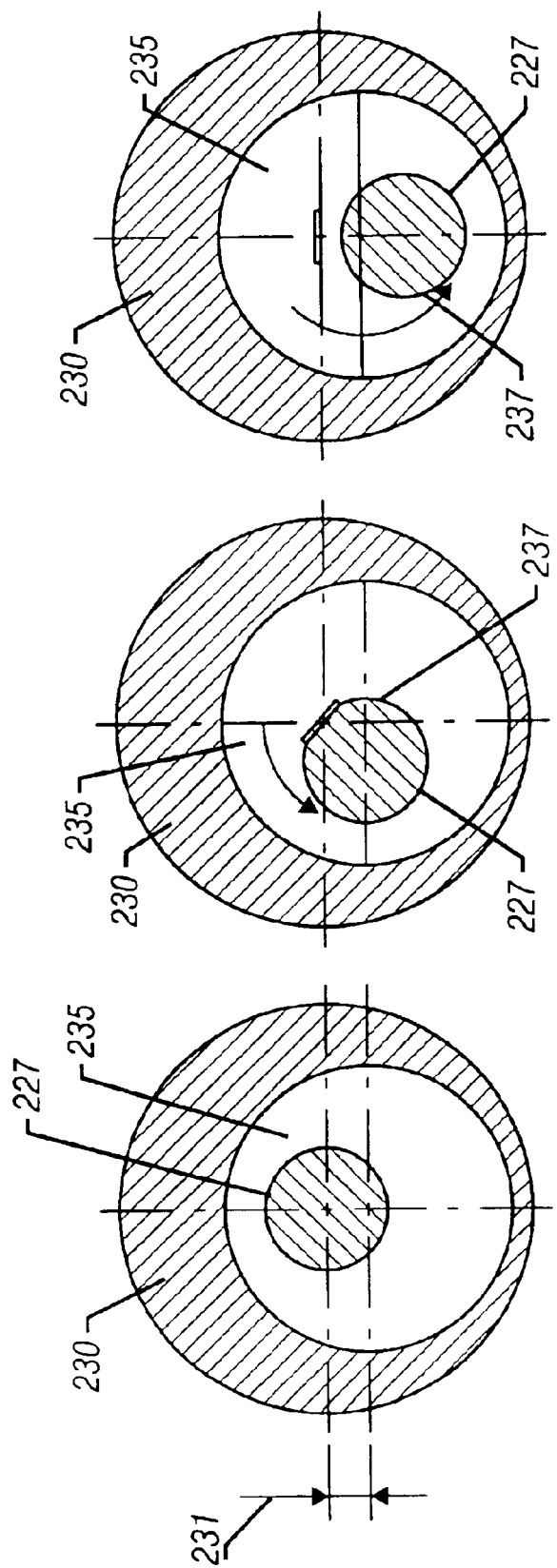
FIG. 9C shows a mechanism to change the eccentricity and therefore the resulting oscillation angle of the gear system according to one preferred embodiment of the present invention.

FIG. 9C serves as an example to show how to adjust the eccentricity of drive pin 227. Drive shaft 230 has an bore, placed eccentric from its axes. Adjustment shaft 235 is placed inside the bore of drive shaft 230. Drive pin 227 is eccentrically fixed onto adjustment shaft 235. The eccentricity 231 of drive pin 227 to the axes of adjustment shaft 235 is the same as the eccentricity of adjustment shaft 235 to axes of drive shaft 230. To change the resulting eccentricity 237 of drive pin 227 to drive shaft 230, the adjustment pin 235 must be turned. Between a 0–180° turn, the resulting eccentricity 237 changes from zero to the maximum eccentricity, which equals two times the original eccentricity.

FIG. 9D shows an example of the gear ratio across the oscillation angle of motor 204. The abscissa 401 shows the motor oscillation angle from 0–360°. The ordinate 403 shows the torque ratio and ordinate 402 shows the speed ratio (the reverse of the torque ratio). At position 407 and 406, the rotor 203 reaches it maximum displacement and reverses the direction of movement. If hydraulic disturbances or loads are acting on the rotor shaft 206 the resulting torque at the motor shaft 204 is zero. Close to these positions, extremely large loads of valve shaft 206 can easily be supported by the motor 204.

Figure 10:
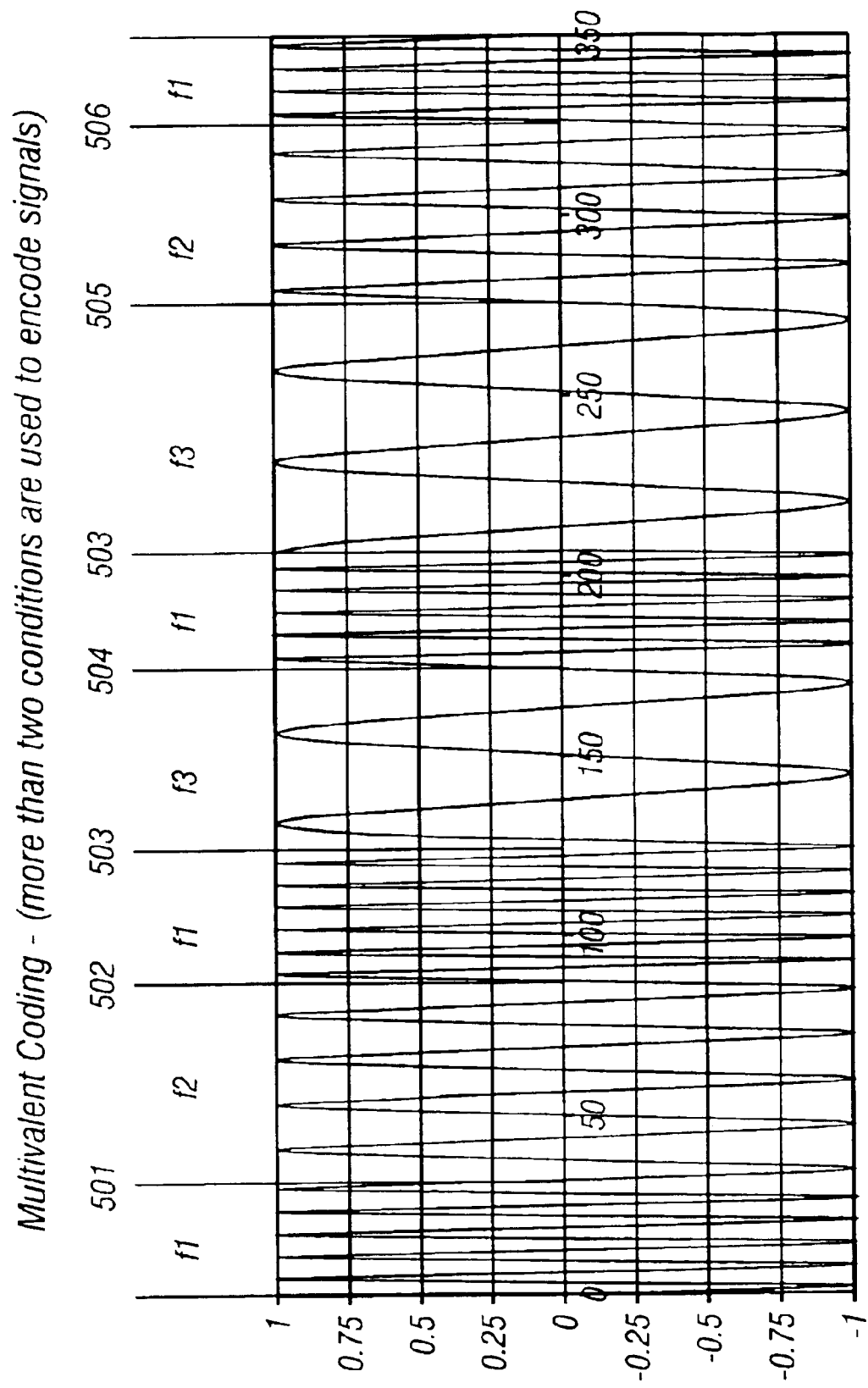
FIG. 10 shows an example of multivalent coding according to one preferred embodiment of the present invention.

FIG. 10 shows an example of multivalent coding. Instead of using a binary code with only two different conditions (on/off condition) advanced coding schemes can be used with the novel shear valve pulser of the present invention. In one preferred embodiment, in FIG. 10, three different frequencies f1, f2, f3 are used to explain multivalent coding. Using the change from one frequency into another one, six different conditions can be defined by using three frequencies. Changing from f1 to f2 is one condition 501. Other conditions are f2-f1 502, f1-f3 503, f3-f1 504, f3-f2 505, f2-f3 (not shown). Instead of frequency changes, phase shift changes, amplitude shift changes, or combinations thereof can be used for multivalent coding.

Figure 11:
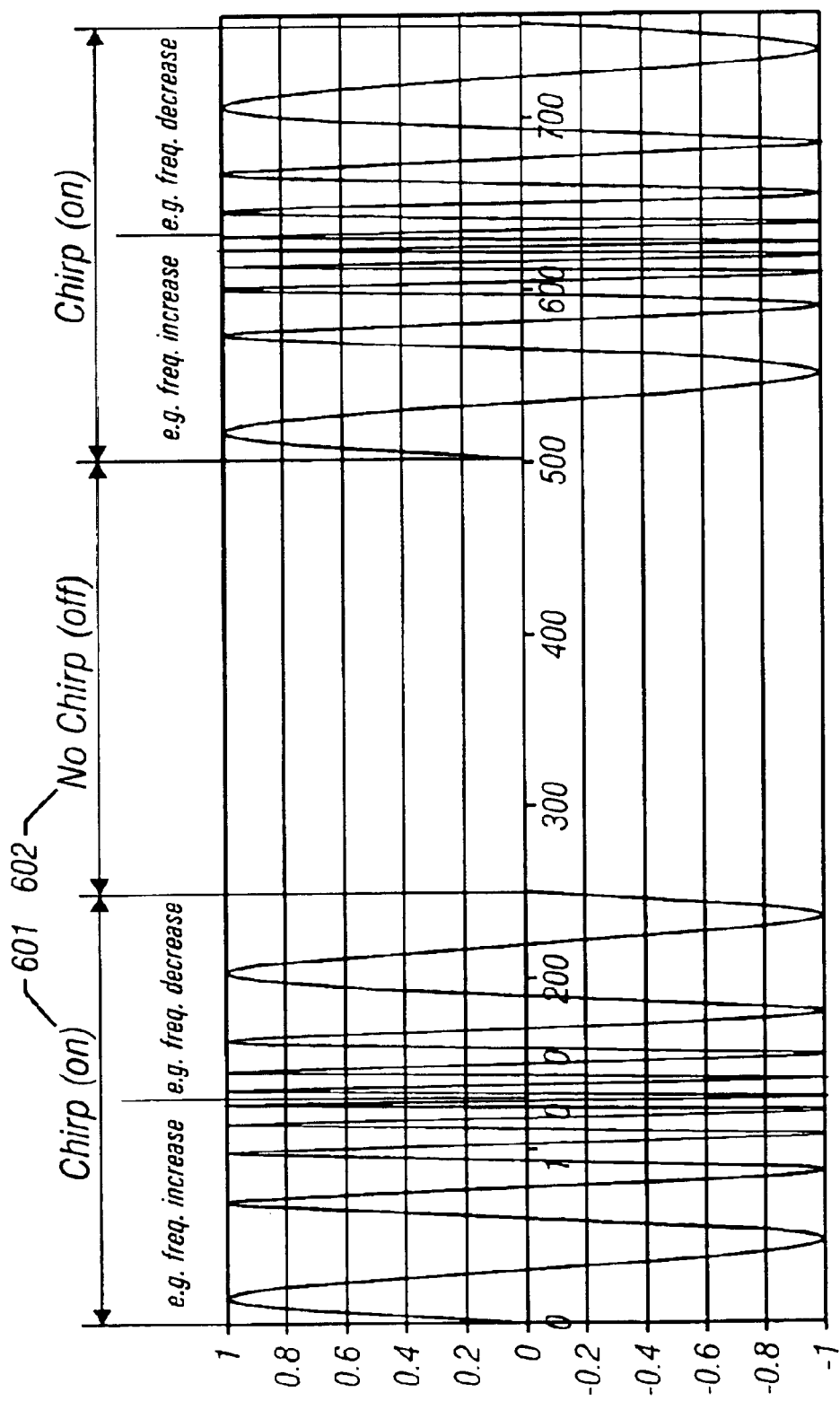
FIG. 11 shows an example of using chirps to encode a signal according to one preferred embodiment of the present invention.

FIG. 11 shows an example how a chirp, or sweep (means a time dependent change in frequency), can be used to encode signals. Advantage of using a chirp is the larger bandwidth of the signal. Signal distortion and attenuation, due to e.g. reflections, is less critical than in a signal using just one—(e.g. Phase shift keying) or two frequencies to modulate/encode the data. In a binary code (on/off), as shown in FIG. 11, the presence of a chirp pattern signifies an "on" 601, and absence of a chirp pattern signifies an "off" 602. The bandwidth and the chirp pattern may be adjusted according to operational conditions.

The envelope curve of the chirp can also be considered as a discrete signal or discrete pulse. The chirp or any other frequency pattern inside the envelope curve gives an additional information to enhance detection of a single pulse at a receiver station.

Figure 12:
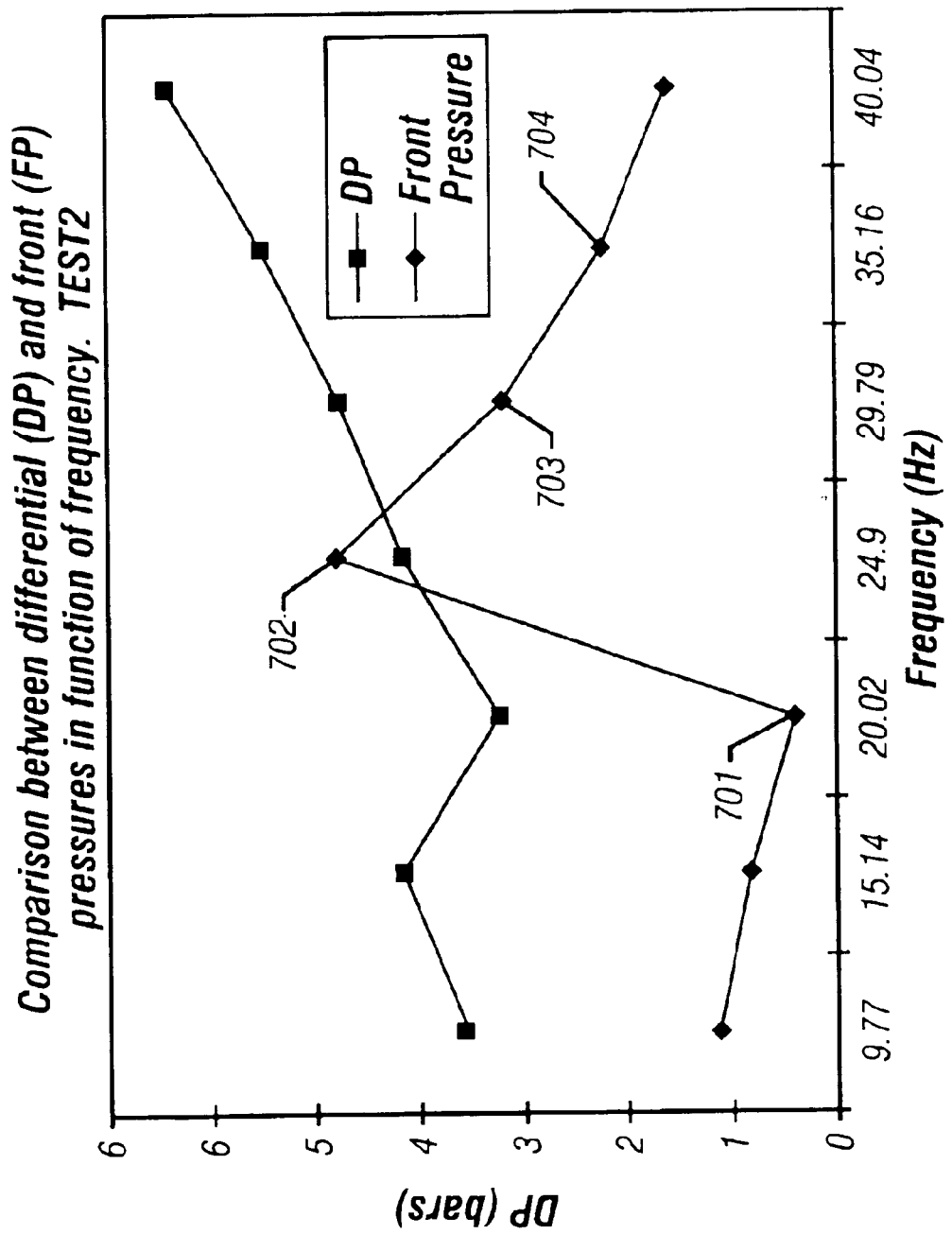
FIG. 12 shows an example of a measured, time-varying frequency signal at the location of a receiver according to one preferred embodiment of the present invention.

FIG. 12 shows the measured signal of different frequencies at the location of a receiver. Due to reflections and interactions of the signal with the system boundaries, commonly used frequencies may be substantially attenuated. With the oscillating shear valve it is possible to choose frequencies exhibiting low attenuation to send and encode signals. As an example given in FIG. 12, for a frequency dependent binary code, the optimum frequencies might be the strong signal at 25 Hz 702 which is easy to detect and the weak signal at 20 Hz 701 which is nearly fully attenuated. Other frequencies of interest might be two low attenuated frequencies 703, 704 at 30 Hz and 35 Hz.

Figure 13:
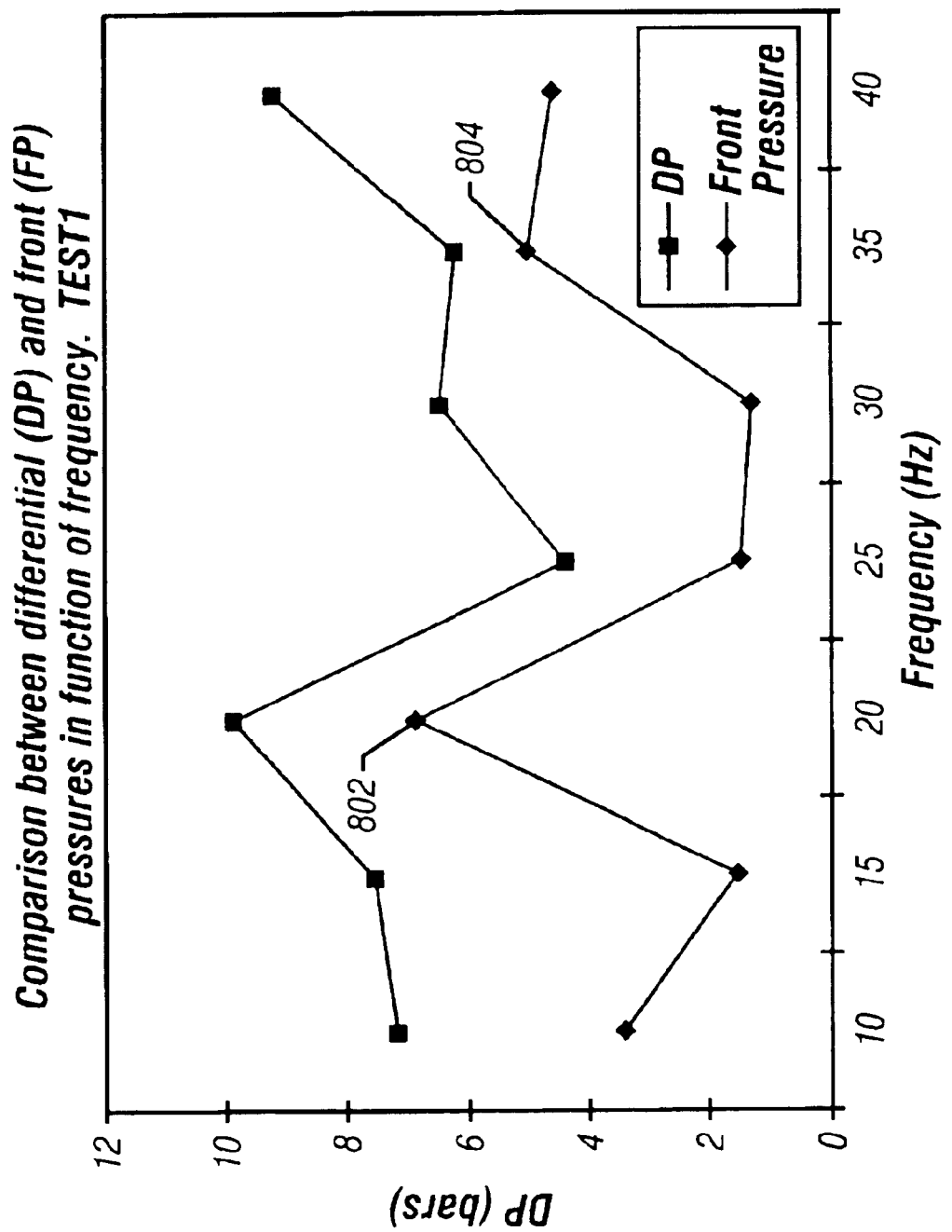
FIG. 13 shows another example of a measured time varying frequency signal at the location of a receiver at another location different from that of FIG. 12 according to one preferred embodiment of the present invention.

FIG. 13 shows, that in a different application, the frequency transmission characteristics may change and other frequencies might be better suited to send a binary signal. In FIG. 13, 20 Hz 802 and 35 Hz 804 could be selected for a binary coding scheme.

Figure 14:
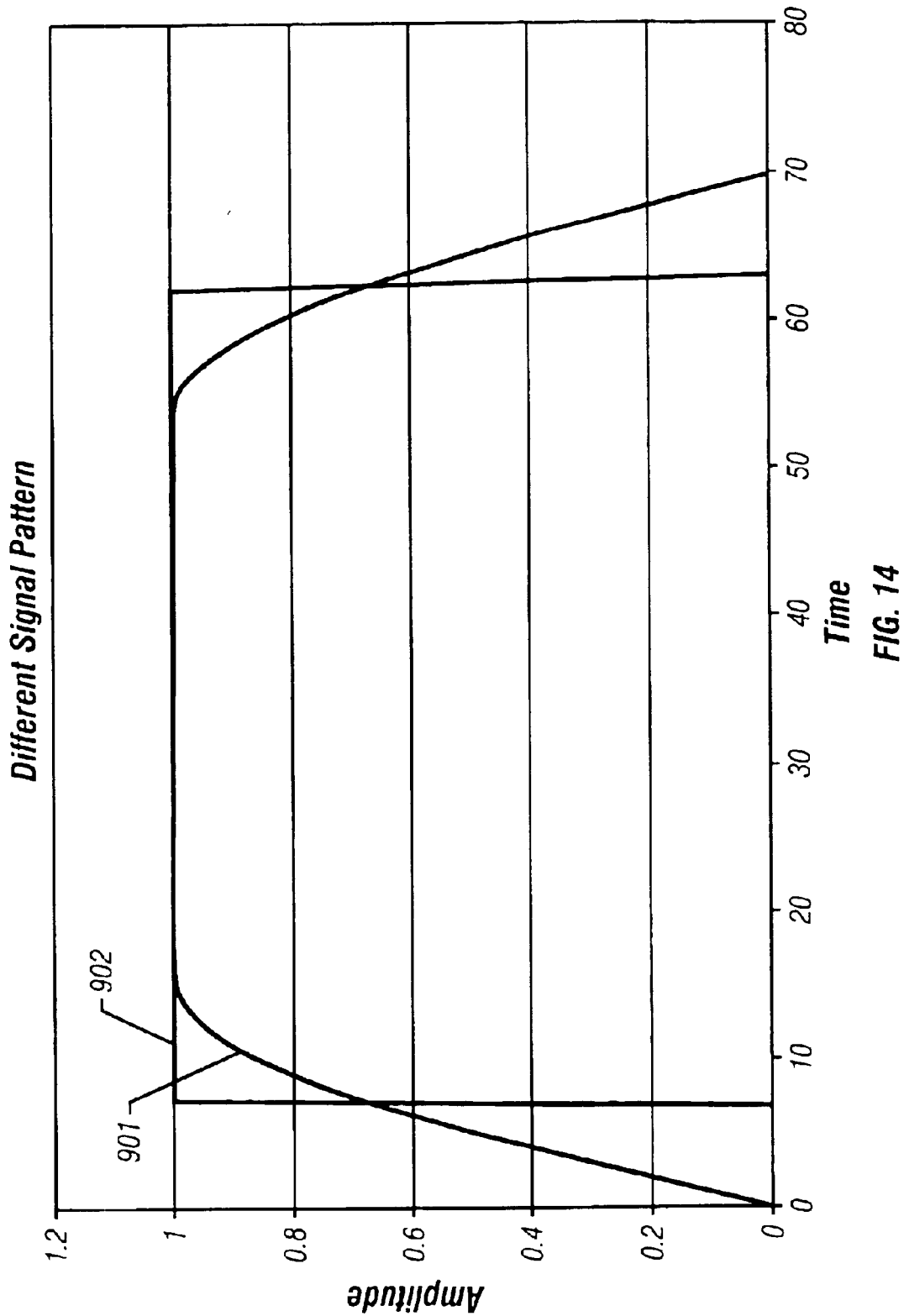
FIG. 14 shows discrete signals of different shapes according to one preferred embodiment of the present invention.

FIG. 14 shows two different shapes of a discrete square type signal. Both signals are generated by using the same rotor shape. Signal 901 features a sinusoidal increase in signal amplitude, followed by a plateau and a sinusoidal decrease in amplitude. Signal 902 is a true square signal. To generate signal 901 requires substantially less power, because less acceleration and deceleration of rotor masses is required to create the signal. Signal 902 requires very fast acceleration and deceleration of the rotor masses. Furthermore, the high frequency content of the sharp edges of signal 902 will suffer strong attenuation. At a far receiver station both signals will therefore look the same.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A mud pulse telemetry system, comprising:
   a. a drillstring having a drilling fluid flowing therein,
   b. a pulser disposed in said drillstring, the pulser comprising:
      i. a non-rotating stator;
      ii. a rotor proximate the stator;
      iii. a motor that drives the rotor in a controllable rotationally oscillating manner for generating pressure fluctuations in the drilling fluid, the motor controlling a signal phase relationship of the rotor according to a predetermined phase shift encoding (PSK) scheme to transmit signals using the pressure fluctuations in the flowing fluid, the PSK scheme comprising:
         driving the rotor in an oscillatory periodic motion with a first predetermined signal phase relationship; and
         changing a drive signal to a second predetermined signal phase relationship according to the PSK scheme at a predetermined rotor speed.

2. The mud pulse telemetry system of claim 1 wherein the PSK scheme further comprises attaining the second predetermined phase relationship in a single oscillatory period.

3. The mud pulse telemetry system of claim 1 wherein the PSK scheme further comprises changing a drive signal to change the oscillatory periodic motion from the second predetermined phase to the first predetermined phase.

4. The mud pulse telemetry system of claim 1 wherein the predetermined rotor speed for changing the drive signal comprises a zero speed transition.

5. The mud pulse system of claim 1 further comprising a drive system that drives the motor in a controllably rotationally oscillating manner.

6. The mud pulse telemetry system of claim 5 wherein the drive system comprises one of (i) a planetary drive gear, (ii) a cam system that converts continuous motor rotation to oscillatory rotor motion, and (iii) a pin and crank system that is adapted to provide an adjustable eccentricity for adjusting the oscillating rotational motion of the rotor.

7. The mud pulse telemetry system of claim 1 further comprising a torsion spring cooperatively acting with the motor to reduce power required to drive the rotor.

8. The mud pulse telemetry system of claim 7 wherein the torsion spring comprises:

i. an outer magnet carrier adapted to move axially within a pulser housing; and
ii. an inner magnet carrier adapted to be attached to a motor drive shaft that drives the rotor.

9. The mud pulse telemetry system of claim 1 further comprising a control circuit that controls the motor motion.

10. A mud pulse telemetry system, comprising:
a. a drillstring having a drilling fluid flowing therein,
b. a pulser disposed in said drillstring, the pulser comprising:
i. a non-rotating stator
ii. a rotor proximate the stator;
iii. a motor that drives the rotor in a controllable rotationally oscillating manner for generating pressure fluctuations in the drilling fluid, the motor controlling a signal frequency of the rotor according to a predetermined frequency shift encoding (FSK) scheme to transmit signals using the pressure fluctuations in the flowing fluid, the FSK scheme comprising:
driving the rotor in an oscillatory periodic motion at a first predetermined frequency; and
changing a drive signal to a second predetermined frequency according to the FSK scheme at a predetermined rotor speed.

11. The mud pulse telemetry system of claim 10 wherein the FSK scheme further comprises attaining the second predetermined frequency in a single oscillatory period.

12. The mud pulse telemetry system of claim 10 wherein the FSK scheme further comprises changing a drive signal to change the oscillatory periodic motion from the second predetermined frequency to the first predetermined frequency to generate encoded signals.

13. The mud pulse telemetry system of claim 10 wherein the predetermined rotor speed for changing the drive signal comprises a zero speed transition.

14. The mud pulse system of claim 10 further comprising a drive system that drives the motor in a controllably rotationally oscillating manner.

15. The mud pulse telemetry system of claim 14 wherein the drive system comprises one of (i) a planetary drive gear, (ii) a cam system that converts continuous motor rotation to oscillatory rotor motion, and (iii) a pin and crank system that is adapted to provide an adjustable eccentricity for adjusting the oscillating rotational motion of the rotor.

16. The mud pulse telemetry system of claim 10 further comprising a torsion spring cooperatively acting with the motor to reduce power required to drive the rotor.

17. The mud pulse telemetry system of claim 16 wherein the torsion spring comprises:
i. an outer magnet carrier adapted to move axially within a pulser housing; and
ii. an inner magnet carrier adapted to be attached to a motor drive shaft that drives the rotor.

18. The mud pulse telemetry system of claim 10 further comprising a control circuit that controls the motor motion.

19. A mud pulse telemetry system, comprising:
a. a drillstring having a drilling fluid flowing therein,
b. a pulser disposed in said drillstring, the pulser comprising:
i. a non-rotating stator;
ii. a rotor proximate the stator;
iii. a motor that drives the rotor in a controllable rotationally oscillating manner for generating pressure fluctuations in the drilling fluid, the motor controlling the rotor according to a predetermined amplitude shift encoding (ASK) scheme to transmit signals using the pressure fluctuations in the flowing fluid, the ASK scheme comprising:
driving the rotor in an oscillatory periodic motion through a first predetermined rotational angle for generating a first pulse amplitude; and
changing a drive signal to a second predetermined rotational angle according to the ASK scheme at a predetermined rotor speed.

20. The mud pulse telemetry system of claim 19 wherein the ASK scheme further comprises attaining the second predetermined rotational angle in a single oscillatory period.

21. The mud pulse telemetry system of claim 19 wherein the ASK scheme further comprises changing a drive signal to change the oscillatory periodic motion from the second predetermined rotational angle to the first predetermined rotational angle to generate signals through the drilling fluid.

22. The mud pulse telemetry system of claim 19 wherein the predetermined rotor speed for changing the drive signal comprises a zero speed transition.

23. The mud pulse system of claim 19 further comprising a drive system that drives the motor in a controllably rotationally oscillating manner.

24. The mud pulse telemetry system of claim 23 wherein the drive system comprises one of (i) a planetary drive gear, (ii) a cam system that converts continuous motor rotation to oscillatory rotor motion, and (iii) a pin and crank system that is adapted to provide an adjustable eccentricity for adjusting the oscillating rotational motion of the rotor.

25. The mud pulse telemetry system of claim 19 further comprising a torsion spring cooperatively acting with the motor to reduce power required to drive the rotor.

26. The mud pulse telemetry system of claim 25 wherein the torsion spring comprises:
i. an outer magnet carrier adapted to move axially within a pulser housing; and
ii. an inner magnet carrier adapted to be attached to a motor drive shaft that dives the rotor.

27. The mud pulse telemetry system of claim 19 further comprising a control circuit that controls the motor motion.

28. A mud pulse telemetry system, comprising:
a. a drillstring having a drilling fluid flowing therein,
b. a pulser disposed in said drillstring, the pulser comprising:
i. a non-rotating stator;
ii. a rotor proximate the stator;
iii. a motor that drives the rotor in a controllable rotationally oscillating manner for generating pressure fluctuations in the drilling fluid, the motor controlling the rotor according to a predetermined combination of an amplitude shift encoding (ASK) scheme and a phase shift encoding (PSK) scheme to transmit signals using the pressure fluctuations in the flowing fluid, the combination of the ASK and PSK schemes comprising:
driving the rotor in an oscillatory periodic motion through a first predetermined rotational angle at a first phase angle thereby generating a first pulse amplitude at a first phase; and
changing a drive signal through a second predetermined rotational angle at a second predetermined phase angle to generate a second pulse amplitude at a second phase.

29. The mud pulse telemetry system of claim 28 wherein the combination of the ASK and PSK schemes further comprises attaining the second predetermined rotational angle at the second predetermined phase relationship in a single oscillatory period.

30. The mud pulse telemetry system of claim 28 wherein the combination of ASK and PSK schemes further comprises changing a drive signal to change the oscillatory periodic motion from the second pulse amplitude at the second phase to the first pulse amplitude at the first phase.

31. The mud pulse system of claim 28 further comprising a drive system that drives the motor in a controllably rotationally oscillating manner.

32. The mud pulse telemetry system of claim 31 wherein the drive system comprises one of (i) a planetary drive gear, (ii) a cam system that converts continuous motor rotation to oscillatory rotor motion, and (iii) a pin and crank system that is adapted to provide an adjustable eccentricity for adjusting the oscillating rotational motion of the rotor.

33. The mud pulse telemetry system of claim 28 further comprising a torsion spring cooperatively acting with the motor to reduce power required to drive the rotor.

34. The mud pulse telemetry system of claim 33 wherein the torsion spring comprises: an outer magnet carrier adapted to move axially within a pulser housing; and ii. an inner magnet carrier adapted to be attached to a motor drive shaft that drives the rotor.

35. The mud pulse telemetry system of claim 28 further comprising a control circuit that controls the motor motion.

36. A mud pulse telemetry system, comprising:
   a. a drillstring having a drilling fluid flowing therein,
   b. a pulser disposed in said drillstring, the pulser comprising:
      i. a non-rotating stator;
      ii. a rotor proximate the stator;
      iii. a motor that drives the rotor in a controllable rotationally oscillating manner for generating pressure fluctuations in the drilling fluid, the motor controlling the rotor according to a predetermined combination of an amplitude shift and frequency shift encoding schemes to transmit signals using the pressure fluctuations in the flowing fluid, the combination of the AKS and FSK schemes comprising: driving the rotor in an oscillatory periodic motion with through a first predetermined rotational angle at a first frequency to generate a first pulse amplitude at the first frequency; and changing a drive signal to drive the rotor through a second predetermined rotational angle at a second frequency to generate a second amplitude pulse-at the second frequency.

37. The mud pulse telemetry system of claim 36 wherein the combination of ASK and FSK schemes further comprises attaining the second predetermined rotational angle at the second frequency in a single oscillatory period.

38. The mud pulse telemetry system of claim 36 wherein the combination of ASK and FSK schemes further comprises changing a drive signal to change the oscillatory periodic motion from the second predetermined rotational angle at the second frequency to the first predetermined rotational angle at the first frequency.

39. The mud pulse system of claim 36 further comprising a drive system that drives the motor in a controllably rotationally oscillating manner.

40. The mud pulse telemetry system of claim 39 wherein the drive system comprises one of (i) a planetary drive gear, (ii) a cam system that converts continuous motor rotation to oscillatory rotor motion, and (iii) a pin and crank system that is adapted to provide an adjustable eccentricity for adjusting the oscillating rotational motion of the rotor.

41. The mud pulse telemetry system of claim 36 further comprising a torsion spring cooperatively acting with the motor to reduce power required to drive the rotor.

42. The mud pulse telemetry system of claim 41 wherein the torsion spring comprises:
   i. an outer magnet carrier adapted to move axially within a pulser housing; and
   ii. an inner magnet carrier adapted to be attached to a motor drive shaft that drives the rotor.

43. The mud pulse telemetry system of claim 36 further comprising a control circuit that controls the motor motion.

* * * * *